(12) United States Patent
Narikawa et al.

(10) Patent No.: US 12,331,483 B2
(45) Date of Patent: Jun. 17, 2025

(54) WORK MACHINE CONTROL SYSTEM

(71) Applicant: Hitachi Construction Machinery Co., Ltd., Tokyo (JP)

(72) Inventors: Ryu Narikawa, Tokyo (JP); Hidekazu Moriki, Tokyo (JP); Shinya Imura, Ibaraki (JP); Shinjirou Yamamoto, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 197 days.

(21) Appl. No.: 18/016,504

(22) PCT Filed: Jul. 26, 2021

(86) PCT No.: PCT/JP2021/027587
§ 371 (c)(1),
(2) Date: Jan. 17, 2023

(87) PCT Pub. No.: WO2022/030286
PCT Pub. Date: Feb. 10, 2022

(65) Prior Publication Data
US 2023/0295898 A1 Sep. 21, 2023

(30) Foreign Application Priority Data
Aug. 5, 2020 (JP) ................. 2020-132824

(51) Int. Cl.
*E02F 9/20* (2006.01)
*E02F 9/22* (2006.01)
(Continued)

(52) U.S. Cl.
CPC .............. *E02F 9/2033* (2013.01); *E02F 9/24* (2013.01); *E02F 9/261* (2013.01); *G06V 20/52* (2022.01);
(Continued)

(58) Field of Classification Search
None
See application file for complete search history.

(56) References Cited

U.S. PATENT DOCUMENTS

2020/0226849 A1    7/2020  Mizuochi et al.
2020/0291614 A1*   9/2020  Kiyota .................... B60R 11/02
2021/0174660 A1*   6/2021  Kamimura ............... G08B 5/36

FOREIGN PATENT DOCUMENTS

JP    2003105807 A  *  4/2003
JP    2017-82430 A     5/2017
(Continued)

OTHER PUBLICATIONS

International Search Report (PCT/ISA/210) issued in PCT Application No. PCT/JP2021/027587 dated Nov. 9, 2021 with English translation (five (5) pages).
(Continued)

*Primary Examiner* — Anshul Sood
*Assistant Examiner* — Wenyuan Yang
(74) *Attorney, Agent, or Firm* — Crowell & Moring LLP

(57) ABSTRACT

A work machine control system includes: a monitoring apparatus that detects a position and an action of a person in a monitored area set around a hydraulic excavator; and a controller that generates a control signal for limiting an action of the hydraulic excavator on the basis of a positional relation between the hydraulic excavator and a detected person detected by the monitoring apparatus, and controls the hydraulic excavator on the basis of the control signal. The controller determines which of a cooperating worker and a non-cooperating worker the detected person is, on the basis of an action of the detected person; and changes an allowable velocity of the work machine at a time of limiting an action of the work machine on the basis of a result of the
(Continued)

determination or on the basis of the result of the determination and the action of the work machine.

8 Claims, 14 Drawing Sheets

(51) Int. Cl.
  *E02F 9/24* (2006.01)
  *E02F 9/26* (2006.01)
  *G06V 20/52* (2022.01)
  *G06V 40/20* (2022.01)
(52) U.S. Cl.
  CPC ............ *G06V 40/20* (2022.01); *E02F 9/2228* (2013.01); *E02F 9/2285* (2013.01); *E02F 9/2292* (2013.01); *E02F 9/2296* (2013.01)

(56) References Cited

FOREIGN PATENT DOCUMENTS

| | | |
|---|---|---|
| JP | 2019-60108 A | 4/2019 |
| JP | 2019-157497 A | 9/2019 |
| JP | 2019-169778 A | 10/2019 |
| WO | WO-2016151932 A1 * | 9/2016 |

OTHER PUBLICATIONS

Japanese-language Written Opinion (PCT/ISA/237) issued in PCT Application No. PCT/JP2021/027587 dated Nov. 9, 2021 (five (5) pages).

International Preliminary Report on Patentability (PCT/IB/338 & PCT/IB/373) issued in PCT Application No. PCT/JP2021/027587 dated Feb. 16, 2023, including English translation (Japanese-language Written Opinion (PCT/ISA/237), filed on Jan. 17, 2023) (seven (7) pages).

* cited by examiner

WORK MACHINE CONTROL SYSTEM

TECHNICAL FIELD

The present invention relates to a work machine control system that controls actions of a work machine on the basis of results of detection by a monitoring apparatus that monitors surroundings of the work machine.

BACKGROUND ART

For work machines such as hydraulic excavators, there are technologies in which, in order to ensure the safety of workers (nearby workers) working around the work machines while wearing helmets or the like, a warning is given to an operator or an action of a work machine is stopped when a person, an obstacle, or the like is detected. Regarding the latter technology, control for preventing contact between a work machine and a person is referred to as contact prevention control in some cases.

For example, Patent Document 1 discloses a monitoring system including an image-capturing apparatus that is attached to a work machine and captures images of surroundings of the work machine. The monitoring system recognizes and identifies a person and protective equipment on an image captured by the image-capturing apparatus, computes an approach distance to the identified person or protective equipment (e.g. a helmet), outputs a warning if the approach distance is equal to or shorter than a first distance, and outputs a warning and stops an action of the work machine if the approach distance is equal to or shorter than a second distance that is shorter than the first distance.

In addition, Patent Document 1 discloses that the first distance and the second distance are increased when the work machine is swinging or positioned at an inclined location. Furthermore, Patent Document 1 discloses that, on the basis of the situation of a person recognized on an image, the first distance and the second distance may be changed, and that, for example, the orientation or a motion of a person is identified by image recognition, and the first distance and the second distance are increased when it is determined that the person is facing the work machine.

PRIOR ART DOCUMENT

Patent Document

Patent Document 1: JP-2019-157497-A

SUMMARY OF THE INVENTION

Problem to be Solved by the Invention

A nearby worker can be classified as a cooperating worker who performs cooperative work with a work machine, or a non-cooperating worker who does not perform cooperative work with the work machine. Cooperative work is work that is performed cooperatively by the work machine and the nearby worker for the same purpose. For example, work that is performed while a nearby worker instructs a hydraulic excavator (operator) to perform fine adjustments of the position of an object to be installed (installation work) is cooperative work. Due to the nature of the work, a cooperating worker is often in a situation where the worker performs work in proximity to a work machine as compared with a non-cooperating worker.

The technology in Patent Document 1 activates action limitation (contact prevention control) of a work machine uniformly for a person who wears protective equipment such as helmet, and does not make distinctions between cooperating worker and non-cooperating worker about the person. Accordingly, for example, if the distance (second distance) for starting action limitation (contact prevention control) of the work machine is set on the basis of the non-cooperating worker, the movable area of the cooperating worker is undesirably limited to the same extent as the movable area of the non-cooperating worker. That is, there is a risk about Patent Document 1 that it becomes less likely for the cooperating worker to approach the work machine, and the efficiency of cooperative work deteriorates. In contrast, if the distance is set on the basis of the cooperating worker, the movable area of the non-cooperating worker is undesirably allowed to the same extent as allowed by the movable area of the cooperating worker, and the risk of contact between the non-cooperating worker and the work machine increases. Note that Patent Document 1 discloses that an alert area and a stop area specified by the first distance and the second distance are made large as compared to those at normal time, but does not disclose that they are made smaller.

An object of the present invention is to provide a work machine control system that makes it possible to inhibit deterioration of the efficiency of cooperative work of a cooperating worker involving cooperation with a work machine even when a nearby worker includes a cooperating worker.

Means for Solving the Problem

The present application includes a plurality of means for solving the problem, and an example thereof is a work machine control system including: a monitoring apparatus that detects a position of a person in a predetermined area set around a work machine; and a controller that generates a control signal for limiting an action of the work machine on the basis of a positional relation between the work machine and a detected person who is a person detected by the monitoring apparatus, and controls the work machine on the basis of the control signal, in which the monitoring apparatus further detects an action of the detected person, and the controller is configured to: determine which of a cooperating worker and a non-cooperating worker the detected person is by using information about the action of the detected person detected by the monitoring apparatus; and change an allowable velocity of the work machine at a time of limiting an action of the work machine on the basis of which of a cooperating worker and a non-cooperating worker the detected person is or on the basis of which of a cooperating worker and a non-cooperating worker the detected person is and of the action of the work machine.

Advantage of the Invention

According to the present invention, it is possible to inhibit deterioration of the efficiency of cooperative work of a cooperating worker involving cooperation with a work machine even when a nearby worker includes a cooperating worker.

MODES FOR CARRYING OUT THE INVENTION

Figure 1:
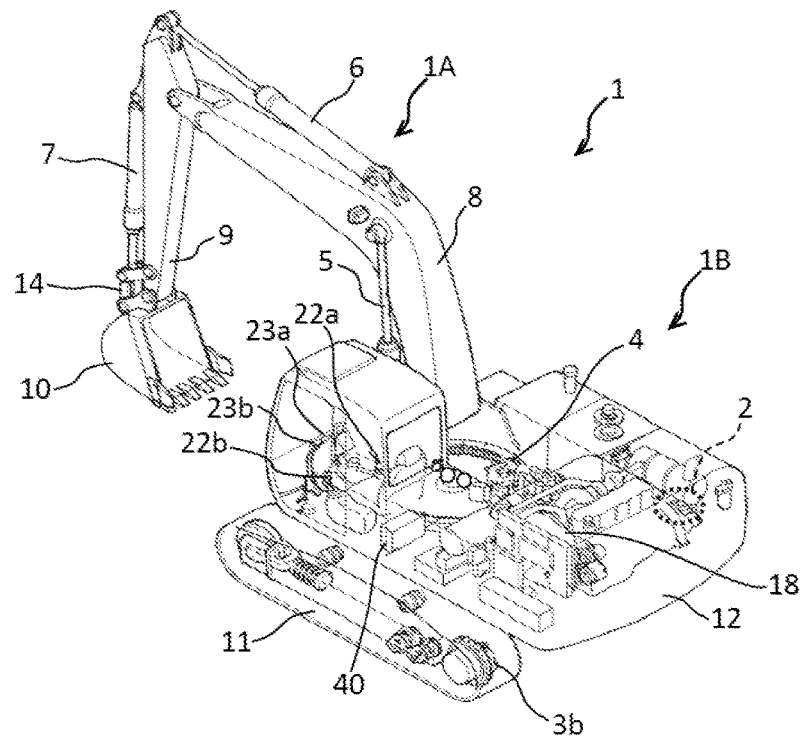
FIG. 1 is a configuration diagram of a hydraulic excavator according to an embodiment of the present invention.

Embodiments of the present invention are explained below by using the figures. Note that whereas the following illustrates, as a work machine, a hydraulic excavator including a bucket as a work device (attachment) at the tip of a work implement, the present invention may be applied to a work machine including an attachment other than a bucket. In addition, the present invention can also be applied to a work machine other than a hydraulic excavator as long as the work machine has an articulated-type work implement including a plurality of link members (an attachment, a boom, an arm, etc.) that are coupled with each other on a swingable structure.

In addition, in the following explanation, where there are a plurality of identical constituent elements, lowercase letters of the alphabet are given at the ends of reference characters in some cases, but the plurality of constituent elements are denoted collectively by omitting the lowercase letters of the alphabet in some cases. For example, when there are three identical pumps 190a, 190b, and 190c, these are denoted collectively as pumps 190 in some cases.

First Embodiment

Figure 2:
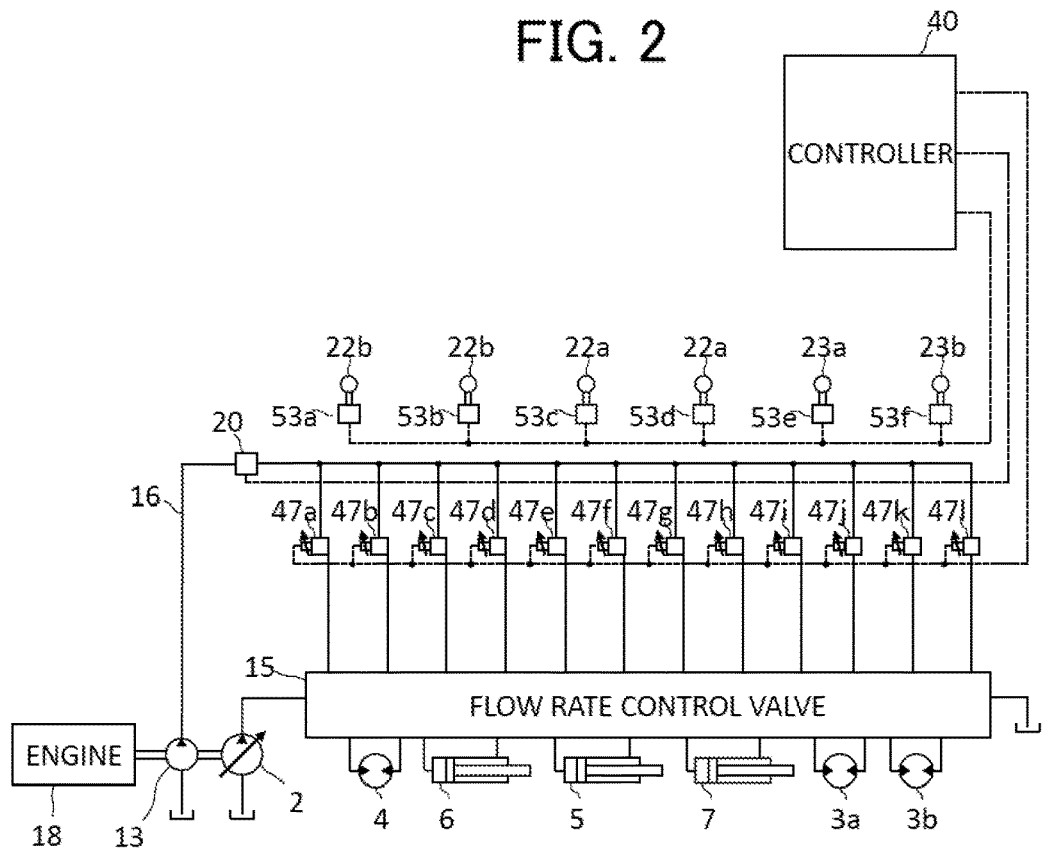
FIG. 2 is a figure depicting a controller of the hydraulic excavator in FIG. 1 along with a hydraulic drive system.

FIG. 1 is a configuration diagram of a hydraulic excavator according to a first embodiment of the present invention, and FIG. 2 is a figure depicting a controller (controller) 40 of the hydraulic excavator according to the embodiment of the present invention along with a hydraulic drive system.

In FIG. 1, a hydraulic excavator 1 includes an articulated-type front work implement 1A and a machine body (machine main body) 1B. The machine body (machine main body) 1B includes a lower travel structure 11 that is caused to travel by left and right travel hydraulic motors 3a and 3b, and an upper swing structure 12 that is attached on the lower travel structure 11, is driven by a swing hydraulic motor 4, and can swing to the left and right.

The front work implement 1A includes a plurality of front implement members (a boom 8, an arm 9, and a bucket 10) that are coupled with each other, and individually pivot vertically, and the front work implement 1A is attached to the upper swing structure 12. The base end of the boom 8 is pivotably supported at a front portion of the upper swing structure 12 via a boom pin. The arm 9 is pivotably coupled to the tip of the boom 8 via an arm pin, and the bucket 10 is pivotably coupled to the tip of the arm 9 via a bucket pin. The boom 8 is driven by a boom cylinder 5, the arm 9 is driven by an arm cylinder 6, and the bucket 10 is driven by a bucket cylinder 7.

In an operation room provided to the upper swing structure 12, a travel right lever 23a for operating a travel right hydraulic motor 3a (the lower travel structure 11), a travel left lever 23b for operating a travel left hydraulic motor 3b (the lower travel structure 11), an operation right lever 22a for operating the boom cylinder 5 (the boom 8) and the bucket cylinder 7 (the bucket 10), and an operation left lever 22b for operating the arm cylinder 6 (the arm 9) and the swing hydraulic motor 4 (the upper swing structure 12) are installed. These are collectively referred to as operation levers 22 and 23 or operation devices 22 and 23 in some cases below.

An engine 18, which is a prime mover mounted on the upper swing structure 12, drives a hydraulic pump 2 and a pilot pump 13 (see FIG. 2). The hydraulic pump 2 is a variable displacement pump, and the pilot pump 13 is a fixed displacement pump.

In the present embodiment, the operation levers 22 and 23 are electric levers as depicted in FIG. 2. The controller 40 detects amounts of operation of the operation devices 22 and 23 operated by an operator by operator operation amount sensors (operation amount sensors) 53a, 53b, 53c, 53d, 53e, and 53f, and outputs current commands according to the detected operation amounts to corresponding solenoid proportional valves 47a, 47b, 47c, 47d, 47e, 47f, 47g, 47h, 47i, 47j, 47k, and 47l. Each solenoid proportional valve 47 is provided on a pilot line 16 connecting the pilot pump 13 and flow rate control valves 15 with each other, and, when there is a command from the controller 40, outputs a pilot pressure according to the command to the flow rate control valves 15.

Each of the flow rate control valves 15 is configured such that a hydraulic fluid from the pump 2 can be supplied to a corresponding one of the swing hydraulic motor 4, the arm cylinder 6, the boom cylinder 5, the bucket cylinder 7, the travel right hydraulic motor 3a, and the travel right hydraulic motor 3b. The solenoid proportional valves are collectively referred to as solenoid proportional valves 47a-1 in some cases below. Note that the solenoid proportional valves 47a-b, the solenoid proportional valves 47c-d, the solenoid proportional valves 47e-f, the solenoid proportional valves 47g-h, the solenoid proportional valves 47i-j, and the solenoid proportional valves 47k-1 supply pilot pressures to the flow rate control valves 15 that supply the hydraulic fluid to the swing hydraulic motor 4, the arm cylinder 6, the boom cylinder 5, the bucket cylinder 7, the travel right hydraulic motor 3a, and the travel right hydraulic motor 3b, respectively.

On the pilot line 16, a lock valve 20 connected with the controller 40 is provided between the pilot pump 13 and solenoid proportional valves 47a-1. A position sensor of a gate lock lever (not depicted) in the operation room is connected with the controller 40. When it is detected by the position sensor that the gate lock lever is at the lock position, the controller 40 locks the lock valve 20, and the supply of the hydraulic fluid (pilot pressures) to the solenoid proportional valves 47a-1 is interrupted, and when it is detected by the position sensor that the gate lock lever is at the unlock position, the controller 40 unlocks the lock valve 20, and the hydraulic fluid is supplied to the solenoid proportional valves 47a-1.

The hydraulic fluid delivered from hydraulic pump 2 is supplied to the travel right hydraulic motor 3a, the travel left hydraulic motor 3b, the swing hydraulic motor 4, the boom cylinder 5, the arm cylinder 6, and the bucket cylinder 7 via the flow rate control valves 15 driven by pilot pressures. The supplied hydraulic fluid causes the boom cylinder 5, the arm cylinder 6, and the bucket cylinder 7 to extend and retract to thereby cause the boom 8, the arm 9, and the bucket 10 to pivot, respectively, and change the position and posture of the bucket 10. In addition, the supplied hydraulic fluid rotates the swing hydraulic motor 4 to thereby swing the upper swing structure 12 relative to the lower travel structure 11. Then, the supplied hydraulic fluid rotates the travel right hydraulic motor 3a and the travel left hydraulic motor 3b to thereby cause the lower travel structure 11 to travel. The travel hydraulic motors 3, the swing hydraulic motor 4, the boom cylinder 5, the arm cylinder 6, and the bucket cylinder 7 are collectively referred to as hydraulic actuators 3 to 7 in some cases below.

Figure 3:
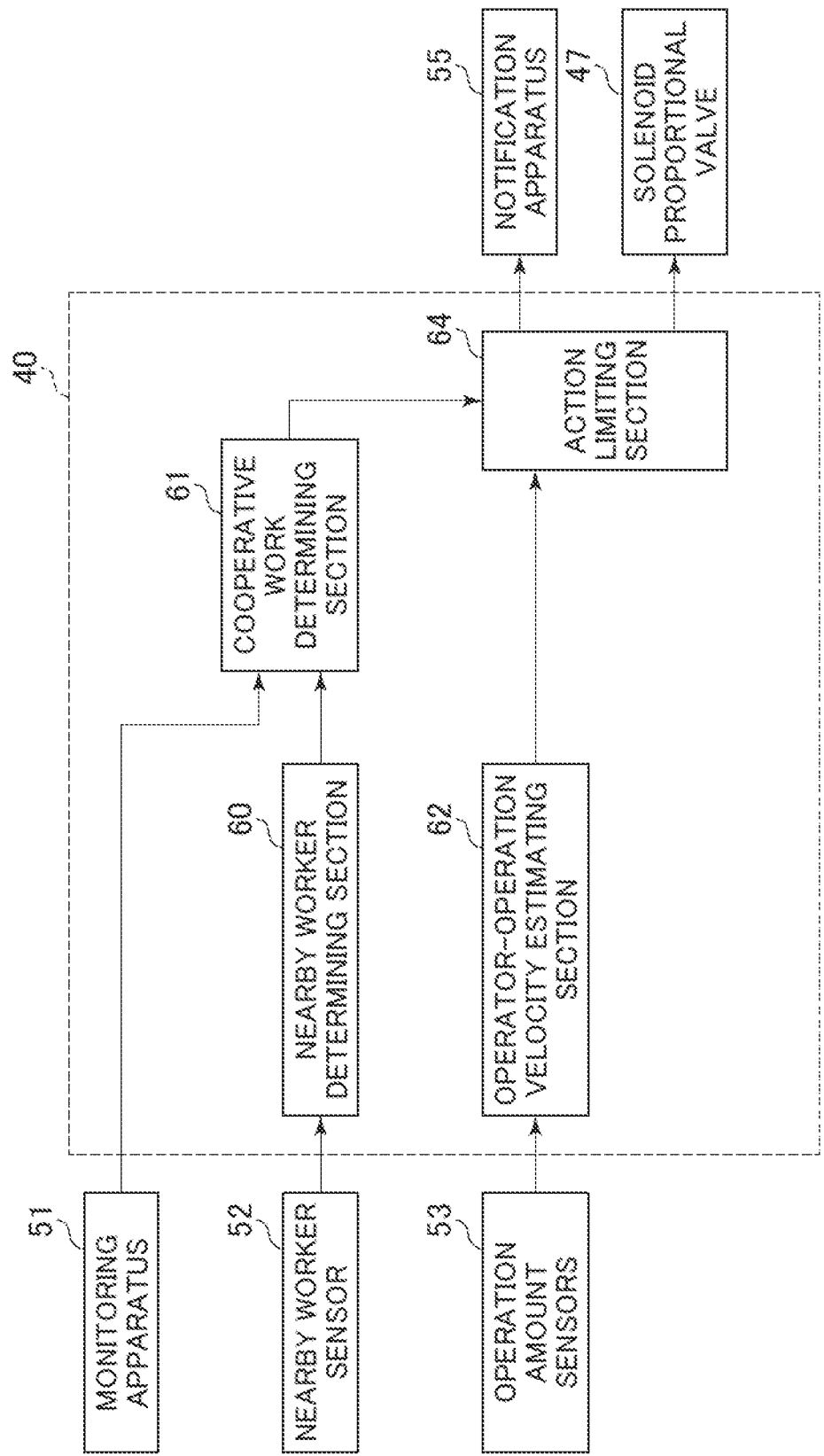
FIG. 3 is a figure depicting configuration of a control system according to a first embodiment.

FIG. 3 is a configuration diagram of a control system included in the hydraulic excavator according to the present embodiment. The control system executes contact prevention control of decelerating or stopping an action of the hydraulic excavator 1 (the front work implement 1A, the upper swing structure 12, the lower travel structure 11) to thereby prevent contact between the hydraulic excavator 1 and a person. The control system depicted in this figure includes: the controller 40, a monitoring apparatus 51 that detects a person in a predetermined area (referred to as a monitored area 71 (see FIG. 4) set around the hydraulic excavator 1; a nearby worker sensor 52 that detects information for determining which of a nearby worker and a uninvolved person a person (referred to as a "detected person" in some cases) who is near the hydraulic excavator and is detected by the monitoring apparatus 51 is; the operation amount sensors 53 that detect amounts of operation on the operation devices 22 and 23 operated by an operator by using rotary encoders, potentiometers, or the like; a notification apparatus 55 that notifies the operator of the state of contact prevention control and the like; and the solenoid proportional valves 47 (47a to 47l) that output pilot pressures for controlling the flow rate control valves 15.

(Monitoring Apparatus 51)

Figure 4:
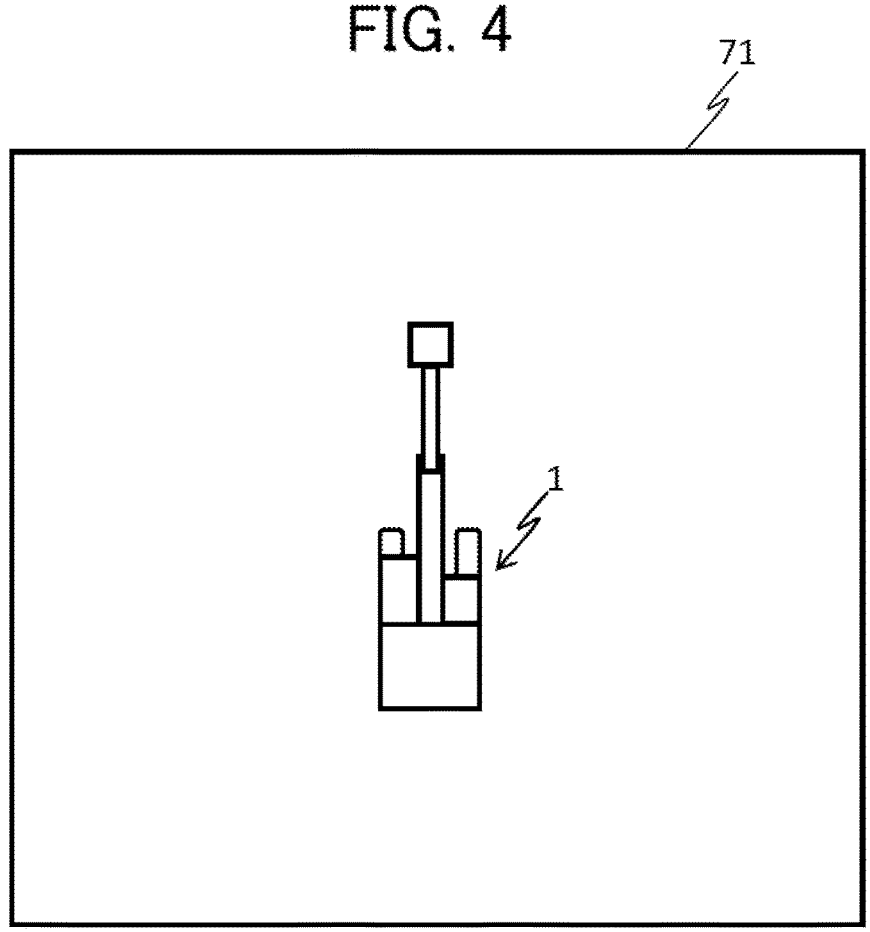
FIG. 4 is a figure depicting an example of a monitored area.
Figure 5:
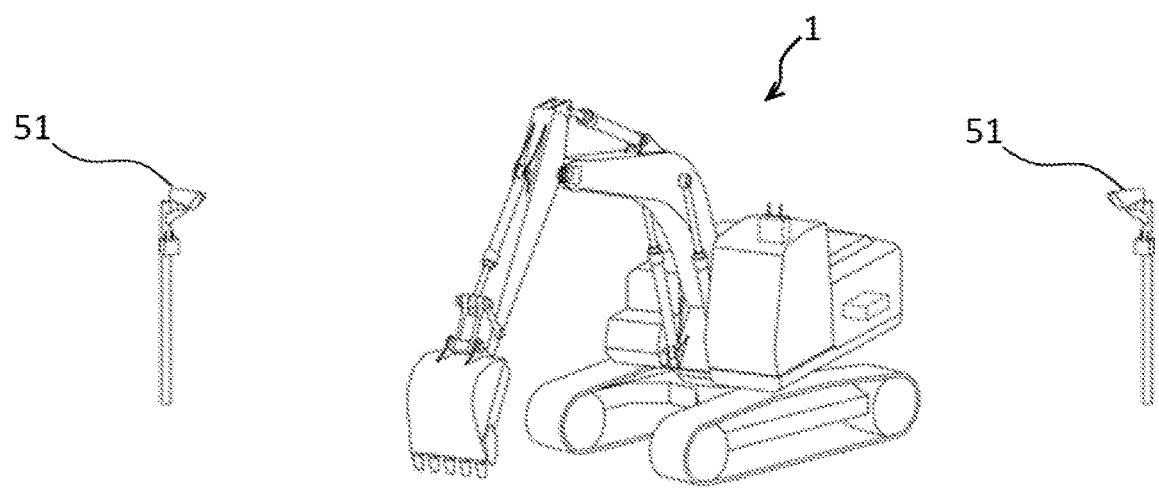
FIG. 5 is a figure depicting an example of the monitored area.

The monitoring apparatus 51 can detect a person in the monitored area 71. As depicted in FIG. 4, the monitored area 71 is a predetermined area formed around the hydraulic excavator 1. It should be noted that the shape of the monitored area 71 depicted in FIG. 4 is merely an example, and, for example, any shape such as a circle centered on the swing center of the hydraulic excavator 1 can be adopted as the shape of the monitored area 71. In addition, the monitoring apparatus 51 can compute the position of a person in the monitored area 71 or the positional relation between the hydraulic excavator 1 and a person in the monitored area 71 (e.g. the distance between the detected person and the hydraulic excavator 1), and can detect an "action" of a person in the monitored area 71. For example, examples of the "action" include the line of sight of a person in the monitored area 71, and an action (e.g. a gesture performed during work) of a person in the monitored area 71. For example, a camera or a LiDAR (Light Detection and Ranging) can be used as the monitoring apparatus 51. The monitoring apparatus 51 may be installed on the front work implement 1A or the upper swing structure 12 (i.e. may be mounted on the hydraulic excavator 1), or a plurality of monitoring apparatuses 51 may be arranged in the environment around the hydraulic excavator 1 as depicted in FIG. 5.

(Nearby Worker Sensor 52)

The nearby worker sensor 52 is an apparatus for detecting information for classifying (determining) the type of the person (detected person) in the monitored area 71 as a nearby worker working near the hydraulic excavator 1 or a uninvolved person who is a person other than the nearby worker. As the nearby worker sensor 52, a radio wave receiver (e.g. a reader/writer) that receives radio wave signals transmitted from small-sized wireless equipment (e.g. RF tags or IC tags) carried by all nearby workers working at a site, or a camera that captures an image of the person (detected person) in the monitored area 71 can be used, for example. Note that a known technology can be used as this type of technology, and, for example, JP-2013-151830-A discloses a technology in which a worker wears a helmet as a marker, a hydraulic excavator recognizes the marker, and thereby an image identifying the worker is displayed to an operator of the hydraulic excavator.

(Controller 40)

The controller 40 includes a computation processing apparatus (e.g. a CPU) for executing various types of program, and a storage apparatus (e.g. a semiconductor memory such as a ROM, a RAM, or a flash memory, or a magnetic storage apparatus such as a hard disk drive) for storing various types of data including the programs, among others. The controller 40, on the basis of the positional relation between the hydraulic excavator 1 and the detected person detected by the monitoring apparatus 51 or the nearby worker sensor 52, generates a control signal for limiting an action of the hydraulic excavator 1, and controls the hydraulic excavator 1 on the basis of the control signal. Particularly, the controller 40 according to the present embodiment changes an allowable velocity of the hydraulic excavator 1 at a time of limiting an action of the hydraulic excavator 1 on the basis of the type (a non-cooperating worker, a cooperating worker, or an uninvolved person) of the detected person determined by using the monitoring apparatus 51, and an action of the hydraulic excavator 1 (operation input to an operation device in the present embodiment).

(Processes Executed by Controller 40)

The controller 40, by the processing apparatus executing programs stored on the storage apparatus in the controller 40, functions as a cooperative work determining section 61, an operator-operation velocity estimating section 62, and an action limiting section 64. Details of processes executed by the controller 40 are explained below.

(Nearby Worker Determining Section 60)

The nearby worker determining section 60, on the basis of information detected by the nearby worker sensor 52, classifies (determines) the type of the person (detected person) in the monitored area 71 as a nearby worker working near the hydraulic excavator 1 or an uninvolved person who is a person other than the nearby worker. As the nearby worker sensor 52, in a case where a radio wave receiver (e.g. a reader/writer) that receives radio wave signals transmitted from RF tags or IC tags carried by all nearby workers working at a site is used, for example, the nearby worker determining section 60 determines whether or not the person is a nearby worker on the basis of the radio wave signal. In addition, in a case where a camera that captures an image of the person (detected person) in the monitored area 71 is used as the nearby worker sensor 52, the nearby worker determining section 60 determines whether or not the person in the image captured by the camera is a nearby worker, on the basis of the feature quantity (appearance feature quantity) on the image of the clothes of the person.

Where a camera is used as the nearby worker sensor 52, the camera can be used also as the monitoring apparatus 51. In addition, when a reader/writer is used as the nearby worker sensor 52, it is necessary to separately provide the monitoring apparatus 51 for detecting a person including an uninvolved person, computing the distance to the person, and detecting action of the person. Note that the monitored area 71 where the nearby worker sensor 52 is used as a person sensor (for detecting only a nearby worker) like the monitoring apparatus 51 is the communicatable distance of the reader/writer.

(Cooperative Work Determining Section 61)

The cooperative work determining section 61, on the basis of information (action information) representing actions of the nearby worker detected by the monitoring apparatus 51, determines which of a cooperating worker and a non-cooperating worker a nearby worker, who is determined as being in the monitored area 71 by the nearby worker determining section 60, is. Examples of action information of a nearby worker include data representing the line of sight of the nearby worker, a motion of the nearby worker, the orientation of the face of the nearby worker and the like. For example, when line-of-sight data of a nearby worker is used as action information from the monitoring apparatus 51, the cooperative work determining section 61 determines that the person detected in the monitored area 71 is a cooperating worker if the line of sight of the nearby worker is oriented to the hydraulic excavator 1. More specifically, taking into consideration gestures of a nearby worker when she/he guides travelling of the hydraulic excavator, when she/he gives instructions for the stop position of the hydraulic excavator, and the like, it is determined that a nearby worker is a cooperating worker on the basis of the line of sight of the nearby worker, a motion of the nearby worker, or the orientation of the face of the nearby worker. Specifically, a posture of a nearby worker extending her/his arm or an action of the nearby worker swinging her/his arm as if she/he guides the hydraulic excavator is regarded as a motion of a nearby worker, and a nearby worker is determined as a cooperating worker on the basis of the line of sight of the nearby worker oriented to the hydraulic excavator or the orientation of the face of the nearby worker when she/he is making the motion. A nearby worker may be determined as a cooperating worker on the basis of the condition that the nearby worker is positioned in an area which is within a predetermined distance from the hydraulic excavator (more specifically, an area within which a nearby worker can be seen by an operator on the hydraulic excavator, or an area within which a camera mounted on the hydraulic excavator can capture an image of the nearby worker), and is making a motion like those described above.

When the monitoring apparatus 51 is a camera, the controller 40 (cooperative work determining section 61) detects the line of sight of a nearby worker (detected person) (an action of the nearby worker) on an image captured by the monitoring apparatus (camera) 51, and, when there is the hydraulic excavator 1 ahead of the detected line of sight, can determine that the nearby worker (detected person) whose line of sight has been detected is a cooperating worker (first process). In addition, the controller 40 (cooperative work determining section 61) detects a motion of a nearby worker (detected person) (an action of the nearby worker) on an image captured by the monitoring apparatus (camera) 51, and, when the detected motion includes a gesture representing cooperative work, can determine that the nearby worker (detected person) who made the motion is a cooperating worker (second process). The controller 40 (cooperative work determining section 61) can determine whether a nearby worker (detected person) is a cooperating worker or a non-cooperating worker by performing either the first process or the second process.

When the monitoring apparatus 51 is a LiDAR, the controller 40 (cooperative work determining section 61) can estimate the line of sight of a nearby worker (detected person) by detecting the orientation of the face of the nearby worker (an action of the nearby worker) by detecting a characteristic shape of protective equipment (e.g. a helmet) fixed to the head of the nearby worker by the monitoring apparatus (LiDAR) 51. Then, when there is the hydraulic excavator 1 ahead of the estimated line of sight, it can be determined that the nearby worker (detected person) whose line of sight has been detected is a cooperating worker (first process). In addition, the controller 40 (cooperative work determining section 61) detects a motion of a nearby worker (detected person) (an action of the nearby worker) by the monitoring apparatus (LiDAR) 51, and, when the detected motion includes a gesture representing cooperative work, can determine that the nearby worker (detected person) who made the motion is a cooperating worker (second process). The controller 40 (cooperative work determining section 61) can determine whether a nearby worker (detected person) is a cooperating worker or a non-cooperating worker by performing either the first process or the second process.

Meanwhile, the cooperative work determining section 61 determines, as an uninvolved person, a person that is included in persons detected in the monitored area 71, but is determined as not a nearby worker by the nearby worker determining section 60. That is, the person (detected person) detected in the monitored area 71 is classified as any one of the three including a cooperating worker, an uninvolved person, and a non-cooperating worker, by the cooperative work determining section 61.

(Operator-Operation Velocity Estimating Section 62)

Figure 6:
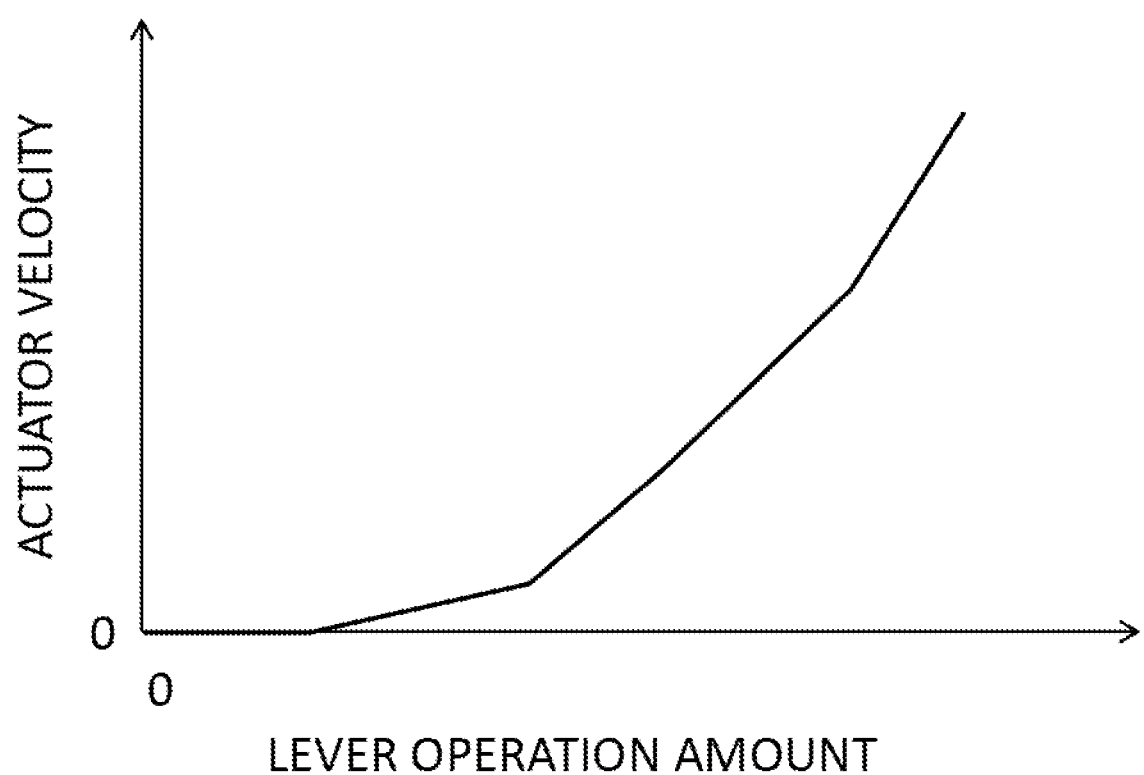
FIG. 6 is a figure depicting a correlation table of lever operation amount and actuator velocity.

The operator-operation velocity estimating section 62, on the basis of amounts of operation by an operator on the operation devices 22 and 23 detected by the operation amount sensors 53, computes velocities (actuator velocities) of the actuators 3, 4, 5, 6, and 7 according to the operator operation. For example, on the basis of a correlation table of actuator velocity and amount of lever operation by an operator (operation amounts of the operation devices 22 and 23) like the one depicted in FIG. 6, velocities of the actuators 3, 4, 5, 6, and 7 specified by the operator operation (also called as demanded velocities of the actuators 3, 4, 5, 6, and 7 demanded by the operator) are computed. The correlation table of operation amount and velocity is preferably set for each actuator 3, 4, 5, 6, or 7.

(Action Limiting Section 64)

The action limiting section 64, when a person is detected in the monitored area 71, generates control signals for decelerating or stopping the actuators 3, 4, 5, 6, and 7 that are in action or about to start an action according to the operator operation, on the basis of the type (any of the three including a cooperating worker, a non-cooperating worker, and an uninvolved person) of the person (detected person), the positional relation between the person (detected person) and the hydraulic excavator 1, and an action of the hydraulic excavator 1 (operation input to the operation devices 22 and 23 in the present embodiment).

Figure 7:
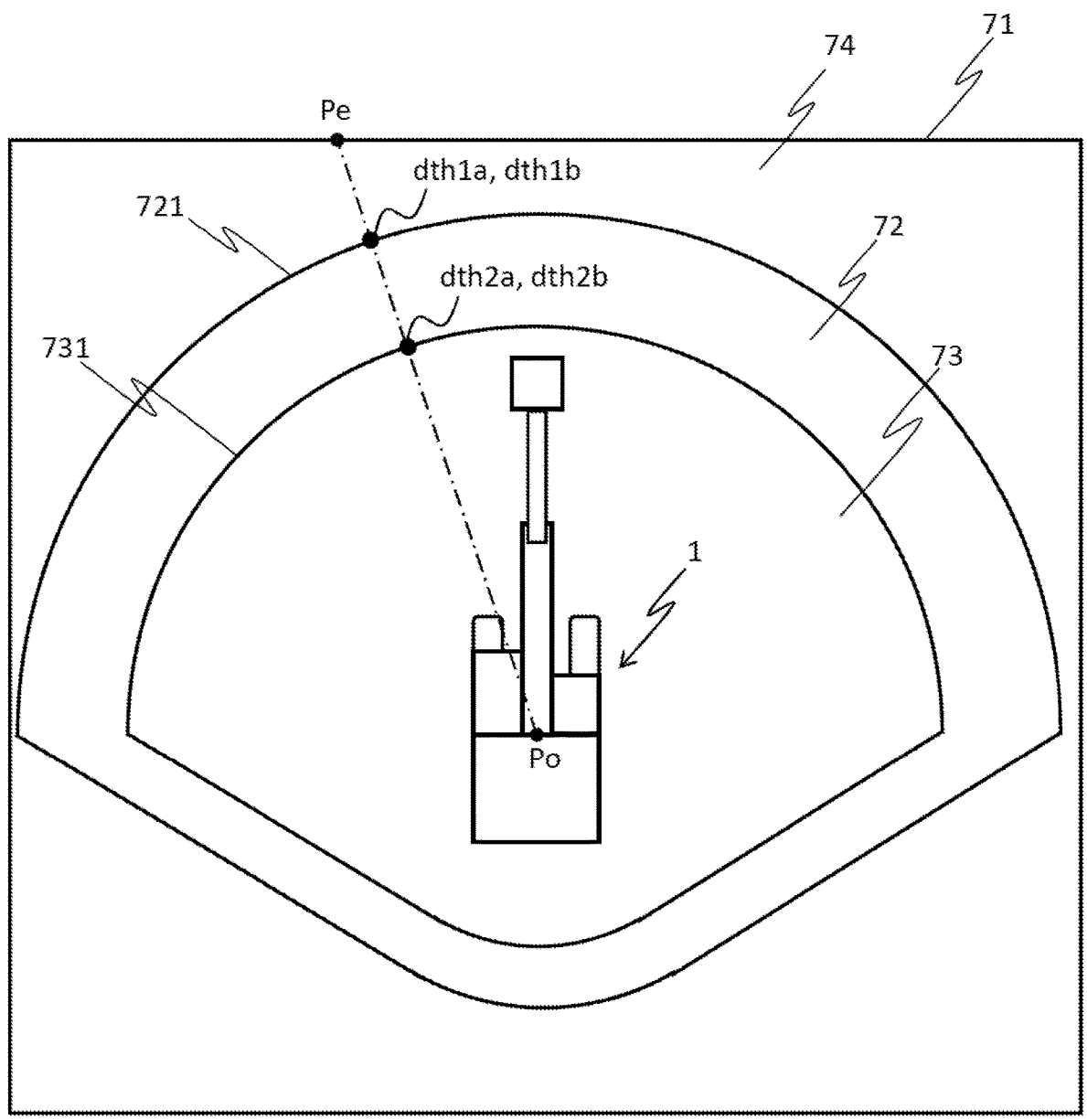
FIG. 7 is a figure depicting an example of the monitored area, a deceleration area, and a stop area.

The monitored area 71 is, as depicted in FIG. 7, divided into three areas which are a stop area 73, a deceleration area 72, and a normal area 74 outward from the hydraulic excavator 1 at its center. When there is a detected person in the stop area 73, an action of the hydraulic excavator 1 (actions of the actuators 3, 4, 5, 6, and 7) is stopped. When there is a detected person in the deceleration area 72, an action of the hydraulic excavator 1 (actions of the actuators 3, 4, 5, 6, and 7) is limited (decelerated). When there is a detected person in the normal area 74, an action of the hydraulic excavator 1 (actions of the actuators 3, 4, 5, 6, and 7) is not limited, but follows operator operation.

The stop area 73 and the deceleration area 72 are divided by a stop area boundary 731, and the deceleration area 72 and the normal area 74 is divided by a deceleration area boundary 721. The stop area 73 is an area on the inner side (the hydraulic-excavator-1 side) of the stop area boundary 731, the deceleration area 72 is an area on the inner side of the deceleration area boundary 721, and on the outer side of the stop area boundary 731, and the normal area 74 is an area on the outer side of the deceleration area boundary 721, and on the outer side of the monitored area 71.

The positions of the stop area boundary 731 and the deceleration area boundary 721 can be changed depending on the type (a cooperating worker, a non-cooperating worker, or an uninvolved person) of a detected person in the monitored area 71. This is explained taking, as an example, the positions of the stop area boundary 731 and the deceleration area boundary 721 along a line Po-Pe in FIG. 7. A point Po is a reference point (e.g. the swing center of the upper swing structure 12) set for the hydraulic excavator 1. A point Pe is an intersection between the boundary of the monitored area 71 and a straight line drawn from the point Po such that it becomes orthogonal to the stop area boundary 731 and the deceleration area boundary 721.

Figure 9:
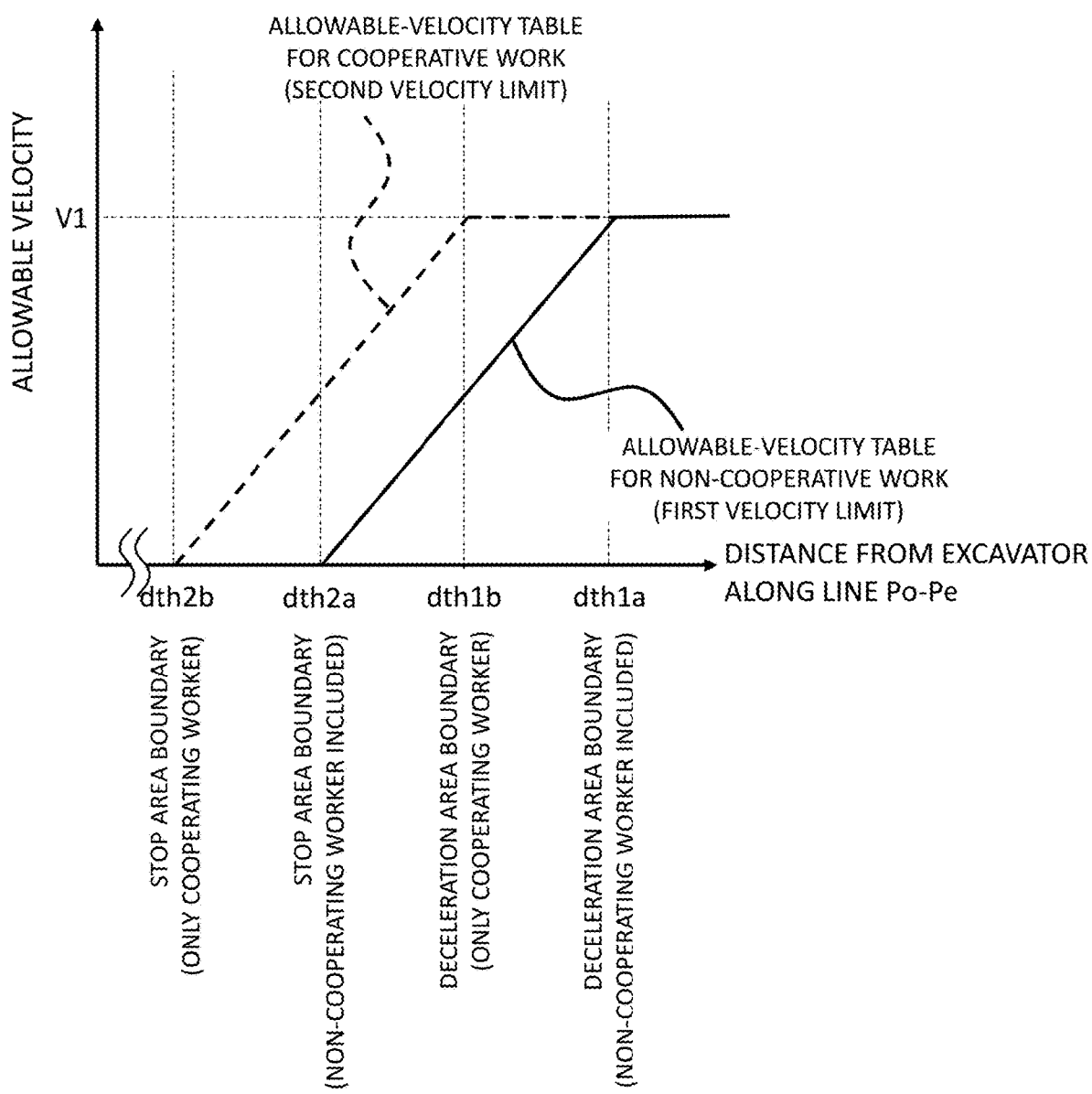
FIG. 9 is a figure depicting a table specifying the relation between the distance from the hydraulic excavator and allowable velocity of actuator.

FIG. 9 depicts tables (referred to as allowable-velocity tables in some cases) specifying examples of correspondences between distances from the hydraulic excavator 1 on the line Po-Pe and allowable velocities of the actuators 3, 4, 5, 6, and 7. An allowable-velocity table drawn with a solid line in FIG. 9 is a table selected when the detected person includes a non-cooperating worker (referred to as an allowable-velocity table for non-cooperative work (a first allowable-velocity table or a first mathematical relation) in some cases). In addition, an allowable-velocity table drawn with a dotted line is a table selected when the detected person includes only a cooperating worker (referred to as an allowable-velocity table for cooperative work (a second allowable-velocity table or a second mathematical relation) in some cases). The maximum value V1 of allowable velocities in the figure can be set to the maximum velocity of each actuator 3, 4, 5, 6 or 7. Note that a table like the ones in FIG. 9 is preferably set for each actuator 3, 4, 5, 6 or 7.

(Allowable-Velocity Table for Non-Cooperative Work (First Allowable-Velocity Table))

In the allowable-velocity table for non-cooperative work (first allowable-velocity table) in FIG. 9, the allowable velocity monotonically decreases from V1 when the distance from the hydraulic excavator 1 has become equal to or shorter than dth1$a$, and thereafter the allowable velocity becomes zero and the hydraulic excavator 1 is stopped when the distance has become equal to or shorter than dth2$a$. That is, dth1$a$ in the figure is the position of the deceleration area boundary 721 at a time of non-cooperative work, and dth2$a$ is the position of the stop area boundary 731 at a time of non-cooperative work.

(Allowable-Velocity Table for Cooperative Work (Second Allowable-Velocity Table))

In addition, in the allowable-velocity table for cooperative work (second allowable-velocity table) represented by the dotted line in FIG. 9, the allowable velocity decreases monotonically from V1 when the distance from the hydraulic excavator 1 has become equal to or shorter than dth1$b$ (where dth1$b$<dth1$a$), and thereafter the allowable velocity becomes zero and the hydraulic excavator 1 is stopped when the distance has become equal to or shorter than dth2$b$ (where dth2$b$<dth2$a$). That is, dth1$b$ in the figure is the position of the deceleration area boundary 721 at a time of cooperative work, and dth2$b$ is the position of the stop area boundary 731 at a time of cooperative work.

The allowable-velocity table for cooperative work (second allowable-velocity table) is specified such that, in terms of comparison about the same distances from the hydraulic excavator 1 (i.e. in terms of comparison under the same condition regarding the positional relation between a detected person and the hydraulic excavator 1), the allowable velocity of an actuator (the velocity after velocity limitation) is faster than the allowable velocity of the actuator in the allowable-velocity table for non-cooperative work (first allowable-velocity table) in an area where the distance from the hydraulic excavator 1 is equal to or shorter than dth1$a$. Thereby, the degree of limitation of an action of the hydraulic excavator 1 is lower at a time of cooperative work. That is, at a time of cooperative work, the degree of limitation of a velocity specified by operator operation is lower, and it becomes less likely for the velocity of the hydraulic excavator 1 to decrease. Accordingly, even if a cooperating worker performs cooperative work with the hydraulic excavator 1, it becomes less likely for an action of the hydraulic excavator 1 to be limited than in a case of work by a non-cooperating worker at the same distance.

When an uninvolved person is detected in the monitored area 71, the allowable velocity is kept at zero in any case irrespective of the distance from the hydraulic excavator 1. Thereby, the actuators 3, 4, 5, 6, and 7 are stopped when an uninvolved person is detected.

Note that, when there are a plurality of detected persons in the monitored area 71, the type of each detected person is determined, and control is performed treating, as the subject, a type that necessitates the greatest degree of limitation of actuator actions in types found by the determination, preferably.

The action limiting section 64 computes, as a method of decelerating or stopping the actuators 3, 4, 5, 6, and 7, the allowable velocities of the actuators 3, 4, 5, 6, and 7 on the basis of the type of the detected person, the distance of the detected person from the hydraulic excavator 1, and an allowable-velocity table like the ones in FIG. 9. Then, when the velocities of the actuators 3, 4, 5, 6, and 7 based on operator operation exceed the allowable velocities, the allowable velocities are set as control demanded velocities of the actuators 3, 4, 5, 6, and 7. Then, the action limiting section 64 generates such control signals for the solenoid proportional valves 47 that the actuators 3, 4, 5, 6, and 7 act at the control demanded velocities, and outputs the generated control signals to the solenoid proportional valves 47. The solenoid proportional valves 47 are adjusted to have valve openings according to the control signals, and cause pilot pressures specified by the valve openings to act on the corresponding flow rate control valves 15. Thereby, the hydraulic fluid to flow into the corresponding actuators 3, 4, 5, 6, and 7 is limited, and the actuators 3, 4, 5, 6, and 7 are decelerated or stopped according to the tables in FIG. 9.

(Control when Person is Detected while Hydraulic Excavator has been Stopped)

An example of control by the controller 40 when a person is detected in the monitored area 71 while the hydraulic excavator 1 is not being operated by an operator (unoperated state) is explained. (1) When a detected person is an "uninvolved person," the stopped state is maintained even if, thereafter, an operator operates the operation levers 22 and 23, and the hydraulic excavator 1 is operated. (2) When a detected person is a "non-cooperating worker," the stopped state is maintained if at least one of operation of the swing structure 12 (swing operation) and operation of the travel structure 11 (travel operation) is being input, and the actuators 5, 6, and 7 are caused to act in accordance with the allowable-velocity table for a non-cooperating worker (the solid line in FIG. 9) if there is only operation of only the front work implement 1A (front-implement operation). (3) When a detected person is a "cooperating worker," the stopped state is maintained when combined operation of travel operation and other operation is performed, and otherwise subject actuators are caused to act in accordance with the allowable-velocity table for a cooperating worker (the dotted line in FIG. 9)

(Notification Apparatus 55)

The notification apparatus 55 notifies an operator of information about the state of contact prevention control by the controller 40. For example, when an actual actuator velocity is limited by contact prevention control as compared to the actuator velocity based on operator operation, a notification to that effect is given. In addition, when a person is detected in the monitored area 71, the presence of the person in the monitored area 71 is notified. Furthermore, when a person is detected in the deceleration area 72 or the stop area 73, a notification to that effect is given. Examples of specific methods of the notification include display by a monitor display (display apparatus), sounds from a speaker (sound output apparatus), lighting/flashing of a warning light, and the like.

(Flowchart According to First Embodiment)

Figure 10:
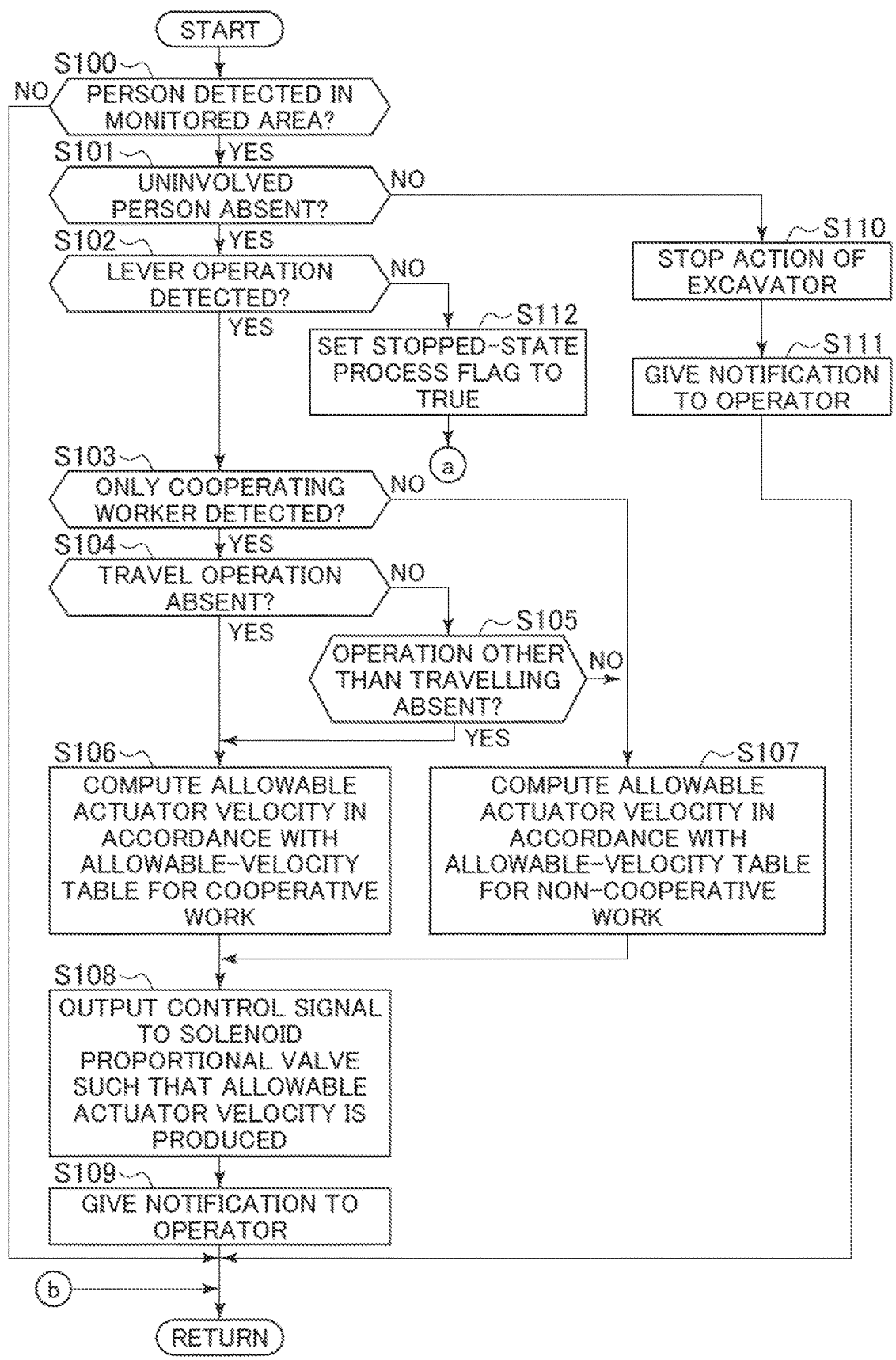
FIG. 10 is a figure depicting a flowchart according to the first embodiment.
Figure 11:
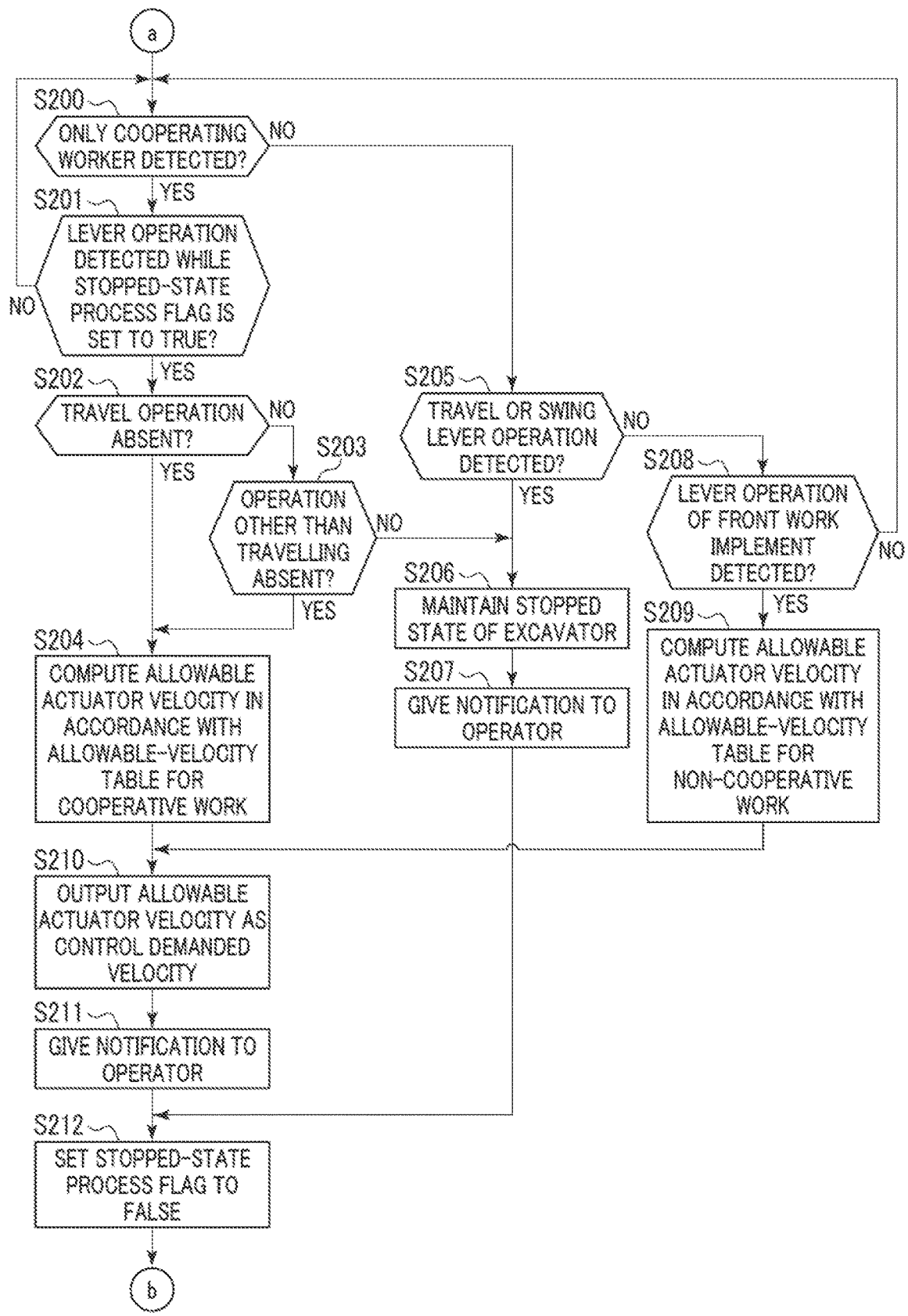
FIG. 11 is a figure depicting a flowchart according to the first embodiment.

Operation of contact prevention control executed by the controller 40 according to the present embodiment is explained by using FIG. 10 and FIG. 11.

At Step S100, the controller 40 (cooperative work determining section 61) determines whether or not a person (detected person) is detected in the monitored area 71. When a person is detected, the procedure proceeds to Step S101, and when a person is not detected, no particular processes are performed.

At Step S101, the controller 40 (cooperative work determining section 61) determines whether or not the person (detected person) detected at Step S100 includes an uninvolved person. Classification of uninvolved person is performed by the nearby worker determining section 60 mentioned earlier. When an uninvolved person is not included, the procedure proceeds to Step S102, and when an uninvolved person is included, the procedure proceed to Step S110.

At Step S102, the controller 40 (operator-operation velocity estimating section 62) determines, on the basis of output of the operation amount sensors 53, whether or not operation (lever operation) of the operation devices 22 and 23 is being input. When lever operation is being input, the procedure proceeds to Step S103. When lever operation is not being input, the procedure proceeds to Step S112.

At Step S103, the controller 40 (cooperative work determining section 61) determines whether or not the person detected at Step S100 includes only a cooperating worker. As mentioned earlier, the determination as to whether the detected person is a cooperating worker or a non-cooperating worker is made on the basis of an action of the detected person detected by the monitoring apparatus 51. When the detected person includes only a cooperating worker (when it is determined that there is only a cooperating worker in the monitored area 71), the procedure proceeds to Step S104. On the other hand, when the detected person includes a non-cooperating worker (when it is determined that there is only a nearby worker in the monitored area 71, and a non-cooperating worker is included in the monitored area 71), the procedure proceeds to Step S107.

At Step S104, the controller 40 (operator-operation velocity estimating section 62) determines whether or not travel operation is being input. When travel operation is not being input, in other words, when at least one of operation of the front work implement 1A (front-implement operation) and swing operation of the upper swing structure 12 is being performed (when operation of the operation devices 22 and 23 other than travel operation is being input, and more specifically only front-implement operation, only swing operation, or combined operation of front-implement operation and swing operation), the procedure proceeds to Step S106. When at least travel operation of the lower travel structure 11 is included, the procedure proceeds to Step S105.

At Step S105, the controller 40 (operator-operation velocity estimating section 62) determines that operation (i.e. front-implement operation and swing operation) other than travel operation is absent. When operation other than travelling is absent, that is, only travel operation is being input, the procedure proceeds to Step S106. When there is operation other than travelling, that is, when combined operation of travel operation and other operation (at least one of front-implement operation and swing operation) is being input, the procedure proceeds to Step S107.

At Step S106, the controller 40 (action limiting section 64) computes (decides) an allowable velocity of an actuator receiving the operation input, on the basis of the distance between the detected person and the area boundary, and the allowable-velocity table for cooperative work (e.g. the second allowable-velocity table represented by the dotted line in FIG. 9) of the actuator receiving operation input.

At Step S107, the controller 40 (action limiting section 64) computes (decides) an allowable velocity of the actuator receiving the operation input, on the basis of the distance between the detected person and the area boundary, and the allowable-velocity table for non-cooperative work (the first allowable-velocity table represented by the solid line in FIG. 9) of the actuator receiving operation input.

At Step S108, the controller 40 (action limiting section 64) generates such a control signal for the solenoid proportional valve 47 that an actuator velocity specified by the operator operation becomes the allowable velocity when the actuator velocity exceeds the allowable velocity computed at Step S106 or Step S107, and outputs the control signal to the solenoid proportional valve 47.

At Step S109, the controller 40 notifies, via the notification apparatus 55, an operator that a nearby worker is detected in the monitored area 71. In addition, when the operator operation is being limited in accordance with any of the two allowable-velocity tables in FIG. 9, the operator is notified, via the notification apparatus 55, that an action of the hydraulic excavator 1 is being limited.

At Step S110, the controller 40 (action limiting section 64) makes the velocities of all the actuators 3, 4, 5, 6, and 7 zero, and forcibly stops an action of the hydraulic excavator 1 since an uninvolved person is included in the detected person. Specifically, control signals are output to the solenoid proportional valves 47 such that the actuator velocities become zero.

At Step S111, the controller 40 notifies, via the notification apparatus 55, the operator that the action of the hydraulic excavator 1 has been stopped since an uninvolved person is detected in the monitored area 71.

In addition, when the procedure proceeds from Step S102 to Step S112, it is decided that the hydraulic excavator 1 has been stopped. At Step S112, the controller 40 sets a stopped-state process flag to true, and thereafter the procedure proceeds to Step S200. Processes at and after Step S200 are explained by using FIG. 11.

At Step S200, the controller 40 (cooperative work determining section 61) determines whether or not the detected person detected in the monitored area 71 while the hydraulic excavator 1 has been stopped includes only a cooperating worker. As mentioned earlier, the determination as to whether the detected person is a cooperating worker or a non-cooperating worker is made on the basis of an action of the detected person detected by the monitoring apparatus 51. When there is only a cooperating worker, the procedure proceeds to Step S201. When there is not only a cooperating worker (i.e. when a non-cooperating worker is included), the procedure proceeds to Step S205.

At Step S201, the controller 40 (operator-operation velocity estimating section 62) determines whether or not there is operation input (lever operation) to the operation devices 22 and 23 in a state in which the stopped-state process flag (see Step S112) is set to true. When there is lever operation, the procedure proceeds to Step S202. When lever operation is absent, the procedure returns to Step S200.

At Step S202, the controller 40 (operator-operation velocity estimating section 62) determines whether or not travel operation is being input. When input of travel operation is absent, that is, when operation (at least one of front-implement operation and swing operation) other than travel operation) is being input, the procedure proceeds to Step S204. On the other hand, when at least travel operation is being input, the procedure proceeds to Step S203.

At Step S203, the controller 40 (operator-operation velocity estimating section 62) determines that operation other than travel is not being input. When input of operation other than travelling is absent, that is, when there is only travel operation, the procedure proceeds to Step S204. When operation other than travel operation is being input, that is, when there is combined operation of travel operation and other operation (at least one of front-implement operation and swing operation), the procedure proceeds to Step S206.

At Step S204, the controller 40 (action limiting section 64) computes (decides) an allowable velocity of the actuator receiving the operation input, on the basis of the distance between the detected person and the area boundary, and the allowable-velocity table for cooperative work (e.g. the second allowable-velocity table represented by the dotted line in FIG. 9) of the actuator receiving operation input.

At Step S205, the controller 40 (operator-operation velocity estimating section 62) determines whether or not travel operation or swing operation is being input to the operation devices 22 and 23. When travel operation or swing operation is being input (i.e. when any one of only travel operation, only swing operation, combined operation of travel operation and swing operation, combined operation of travel operation and front-implement operation, combined operation of swing operation and front-implement operation, and combined operation of travel operation, swing operation, and front-implement operation is being input), the procedure proceeds to Step S206. When input of travel operation or swing operation is absent, the procedure proceeds to Step S208.

At Step S206, the controller 40 (action limiting section 64) outputs a control signal to the solenoid proportional valve 47 such that the velocity of the actuator related to the operator operation is kept at zero, and the stopped state of the hydraulic excavator 1 is forcibly maintained.

At Step S207, the controller 40 notifies, via the notification apparatus 55, the operator that the stopped state of the hydraulic excavator 1 is maintained.

At Step S208, the controller 40 (operator-operation velocity estimating section 62) decides whether or not lever operation (front-implement operation) on the front work implement 1A is being input. When front-implement operation is being input (i.e. when only front-implement operation is being input), the procedure proceeds to Step S209. When input of front-implement operation is absent (i.e. when input to the operation devices 22 and 23 is absent at all), the procedure returns to Step S200.

At Step S209, the controller 40 (action limiting section 64) computes (decides) an allowable velocity of an actuator (at least one of the hydraulic cylinders 5, 6, and 7) receiving the operation input, on the basis of the distance between the detected person and the area boundary, and the allowable-velocity table for non-cooperative work (the first allowable-velocity table) of the actuator receiving operation input.

At Step S210, the controller 40 (action limiting section 64) generates such a control signal for the solenoid proportional valve 47 that an actuator velocity specified by the operator operation becomes the allowable velocity when the actuator velocity exceeds the allowable velocity computed at Step S204 or Step S209, and outputs the control signal to the solenoid proportional valve 47.

At Step S211, the controller 40 notifies, via the notification apparatus 55, the operator that the actuator velocity is being reduced.

At Step S212, the controller 40 sets the stopped-state process flag to false, and the procedure returns to Step S100.

(Advantages)

According to the thus-configured control system of the hydraulic excavator 1, when there is only a cooperating worker in the deceleration area 72, an allowable velocity of the hydraulic excavator 1 is set large as compared with the case where there is a non-cooperating worker in the deceleration area 72. In addition, the boundary 721 between the normal area 74 and the deceleration area 72, and the boundary 731 between the deceleration area 72 and the stop area 73 are set closer to the hydraulic excavator 1 at a time of cooperative work than at a time of non-cooperative work, and the deceleration area 72 and the stop area 73 at a time of cooperative work are made smaller than at a time of non-cooperative work. Thereby, deceleration and stop of the hydraulic excavator 1 are inhibited more during cooperative work than during non-cooperative work. Accordingly, according to the present embodiment, since situations where an action of the hydraulic excavator 1 is limited during cooperative work of a cooperating worker involving cooperation with the hydraulic excavator 1 can be reduced, deterioration of the efficiency of cooperative work can be inhibited.

It should be noted that in the present embodiment, when there is combined operation of travel operation and front-implement operation or swing operation, the hydraulic excavator 1 is controlled on the basis of the allowable-velocity table for non-cooperative work even when there is only a cooperating worker in the deceleration area 72. In a situation where such operation is input, the area where the hydraulic excavator 1 can move in a short time is large, and the possibility that even a cooperating worker comes into contact with the hydraulic excavator 1 can increase. Because of this, by limiting allowable velocities, the possibility that the cooperating worker comes into contact with the hydraulic excavator 1 is reduced.

In addition, since, when there is an uninvolved person not related to work in the monitored area 71, an action of the hydraulic excavator 1 is stopped forcibly in the present embodiment, the uninvolved person can be prevented from coming into contact with the hydraulic excavator 1.

Furthermore, even when only a cooperating worker is detected in the deceleration area 72 while the hydraulic excavator 1 has been stopped, if there is combined operation of travel operation and front-implement operation or swing operation, an action based on the operation is not started, but the stopped state of the hydraulic excavator 1 is maintained. Thereby, since, when an operator is about to activate the hydraulic excavator 1 by combined operation with travel operation, activation of the hydraulic excavator 1 according to the combined operation is prohibited, the cooperating worker can be prevented from coming into contact with the hydraulic excavator 1.

In addition, similarly, when a non-cooperating worker is detected in the deceleration area 72 while the hydraulic excavator 1 has been stopped, and travel operation or swing operation is input, an action based on the operation is not started, but the stopped state of the hydraulic excavator 1 is maintained. Thereby, since, when an operator is about to activate the hydraulic excavator 1 by travel operation or swing operation, activation of the hydraulic excavator 1 according to the operation is prohibited, the non-cooperating worker or cooperating worker can be prevented from coming into contact with the hydraulic excavator 1.

In addition, when a non-cooperating worker is detected in the deceleration area 72 while the hydraulic excavator 1 has been stopped, and only front-implement operation is input, the hydraulic excavator 1 is controlled on the basis of the allowable-velocity table for non-cooperative work (Step S209). That is, since an action of the front work implement 1A based on front-implement operation is allowed, deterioration of the work efficiency can be inhibited.

(Others)

Figure 8:
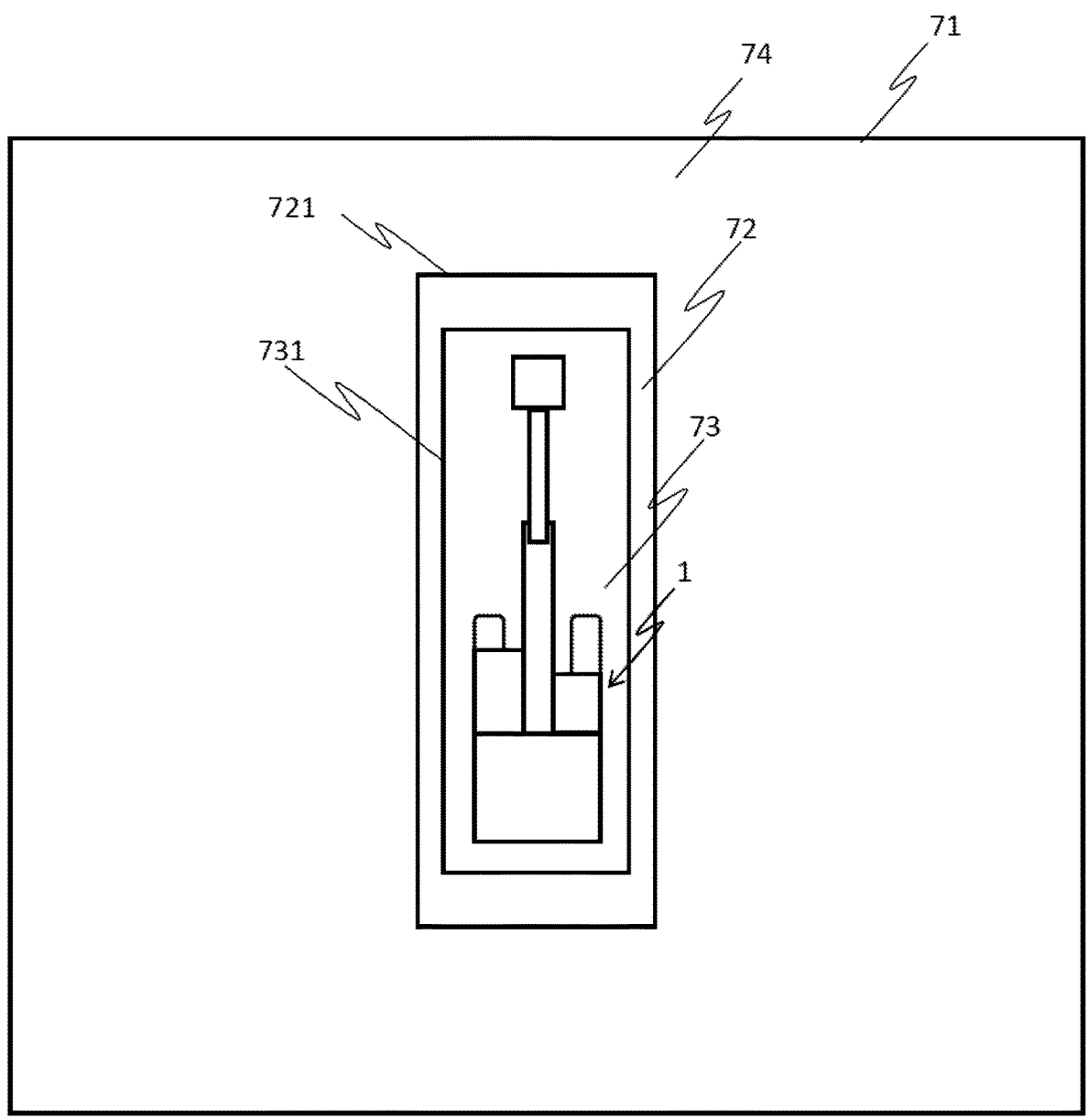
FIG. 8 is a figure depicting an example of the monitored area, the deceleration area, and the stop area.

Note that when only a cooperating worker is detected by the monitoring apparatus 51, the deceleration area 72 and stop area 73 in the monitored area 71 may be made smaller, and may be deformed into rectangles as in FIG. 8 (e.g. the lengthwise direction of the oblongs is arranged along the front-back direction of the hydraulic excavator 1). Since, if the deceleration area 72 and the stop area 73 are made smaller in this manner, an area within Ih the hydraulic excavator 1 is subjected to action limitation can be made further smaller, it is possible to achieve further inhibition of deterioration of the cooperative work efficiency.

In addition, when only a cooperating worker is detected by the monitoring apparatus 51, timings at which the deceleration area 72 and the stop area 73 in FIG. 8 are adopted may be limited to timings when only front-implement operation is input. Thereby, since, when the cooperating worker is positioned outside the deceleration area 72, and away from the action plane of the front work implement 1A, an action of the front work implement 1A is not limited, the work efficiency can be enhanced.

Furthermore, the action limiting section 64 may maintain the stopped state of an action of the hydraulic excavator 1, or reduce the velocities of actuators to velocities lower than those specified by operator operation, and so on when a person is detected in the monitored area 71 while the hydraulic excavator 1 is not being operated by an operator (while the hydraulic excavator 1 has been stopped). For example, the stopped state of the hydraulic excavator 1 may be maintained even if there is operation input when the detected person is an uninvolved person or a non-cooperating worker, and an action of the hydraulic excavator 1 may be decelerated when the detected person is a cooperating worker, in other possible configuration. In addition, when the detected person is a non-cooperating worker, and there is no non-cooperating worker on a line extending from the front work implement 1A, the stopped state of the front work implement 1A may not be maintained, but the front work implement 1A may be caused to act at allowable velocities.

Note that, in the flowcharts in FIGS. 10 and 11, allowable-velocity tables to be used when allowable velocities of the actuators 3, 4, 5, 6, and 7 according to operation input are decided are selected on the basis of two factors which are the type of the detected person (cooperating worker, non-cooperating worker, or uninvolved person) and an action of the hydraulic excavator 1 (specifically, an action estimated from operation input to the operation devices 22 and 23). However, allowable-velocity tables to be used for decision of allowable velocities of the actuators 3, 4, 5, 6, and 7 according to operation input may be selected on the basis of only the type of the detected person (cooperating worker, non-cooperating worker, or uninvolved person). In this case, Steps S104 and S105 are omitted from FIG. 10, and Steps S202 and S203 are omitted from FIG. 11.

Second Embodiment

While the present embodiment uses, as its basis, the method explained in the first embodiment, the present embodiment is mainly characterized in that velocity vectors (an estimated velocity vector and an actual velocity vector) of the hydraulic excavator 1 are computed, and an allowable-velocity table is selected by taking into consideration the relation between the directions of the velocity vectors and the detected person. Note that explanations of portions which have counterparts in the first embodiment are omitted as appropriate, in some cases.

Figure 12:
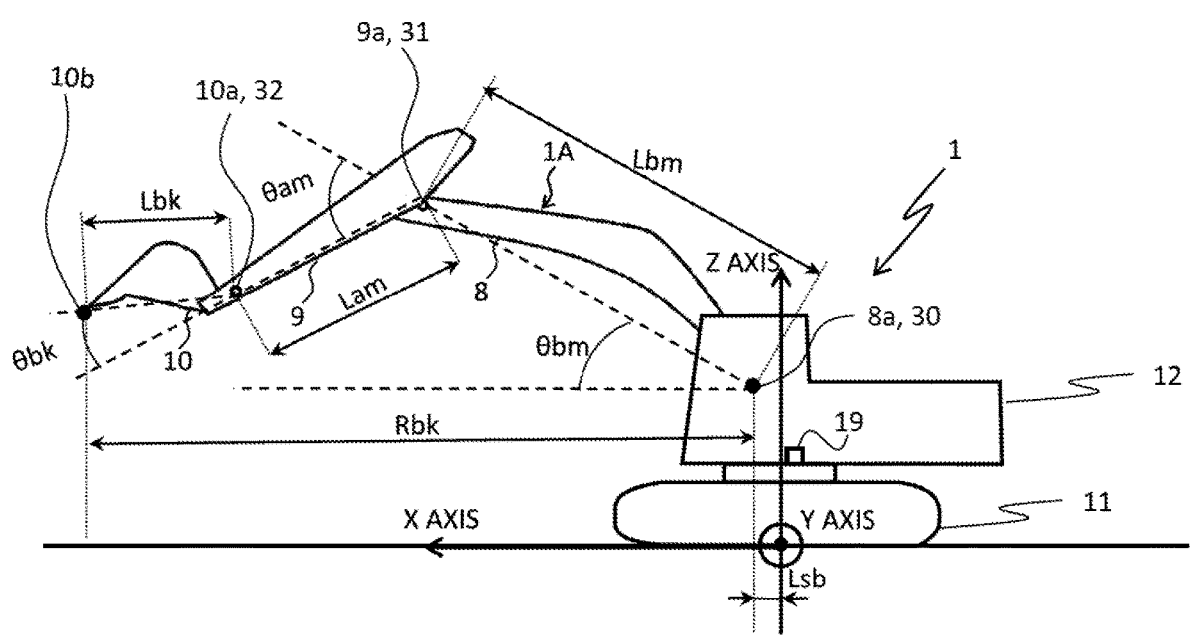
FIG. 12 is a figure depicting a coordinate system of the hydraulic excavator.

As depicted in FIG. 12, the hydraulic excavator 1 in the present embodiment includes a boom-angle sensor 30 attached to a boom pin 8a, an arm-angle sensor 31 attached to an arm pin 9a, and a bucket angle sensor 32 attached to a bucket link 14 in order to measure pivot angles θbm, θam, and θbk of the boom 8, the arm 9, and the bucket 10. Note that each of the angle sensors 30, 31, and 32 can be replaced with an angle sensor (e.g. an IMU) that detects the angle relative to a reference plane (e.g. the horizontal plane). Alternatively, each of them may be replaced with a cylinder stroke sensor that detects the stroke of the hydraulic cylinder 5, 6, or 7, and the obtained cylinder stroke may be converted into an angle, in other possible configuration.

In addition, a swing angle sensor 19 that can detect a relative angle (swing angle θsw) between the upper swing structure 12 and the lower travel structure 11 is attached near the rotation center between the upper swing structure 12 and the lower travel structure 11.

The posture of the hydraulic excavator 1 can be defined in an excavator reference coordinate system depicted in FIG. 12. The excavator reference coordinate system has its origin at a point which is on the swing center axis of the upper swing structure 12, and at which the lower travel structure 11 contacts the ground. The direction in which the advancing direction of the lower travel structure 11 when it moves forward straight, the action direction which is parallel to the action plane of the front work implement 1A and is the extension direction of the front work implement 1A, and the action direction when the lower travel structure 11 is caused to move forward coincide with each other is defined as the X axis, and this is fixedly set on the lower surface of the lower travel structure 11 (the ground-contacting surface along which the lower travel structure 11 contacts the ground). The swing center of the upper swing structure 12 is defined as the Z axis, and the Y axis is set such that it forms a right-handed coordinate system together with the X axis and Z axis mentioned before. In addition, the swing angle θsw becomes 0 degrees when the front work implement 1A becomes parallel to the X axis. The rotation angle of the boom 8 relative to the X axis is defined as a boom angle θbm, the rotation angle of the arm 9 relative to the boom 8 is defined as an arm Gam, the rotation angle of the claw tip of the bucket 10 relative to the arm 9 is defined as a bucket angle θbk, and the swing angle of the upper swing structure 12 relative to the lower travel structure 11 is defined as a swing angle θsw.

Figure 13:
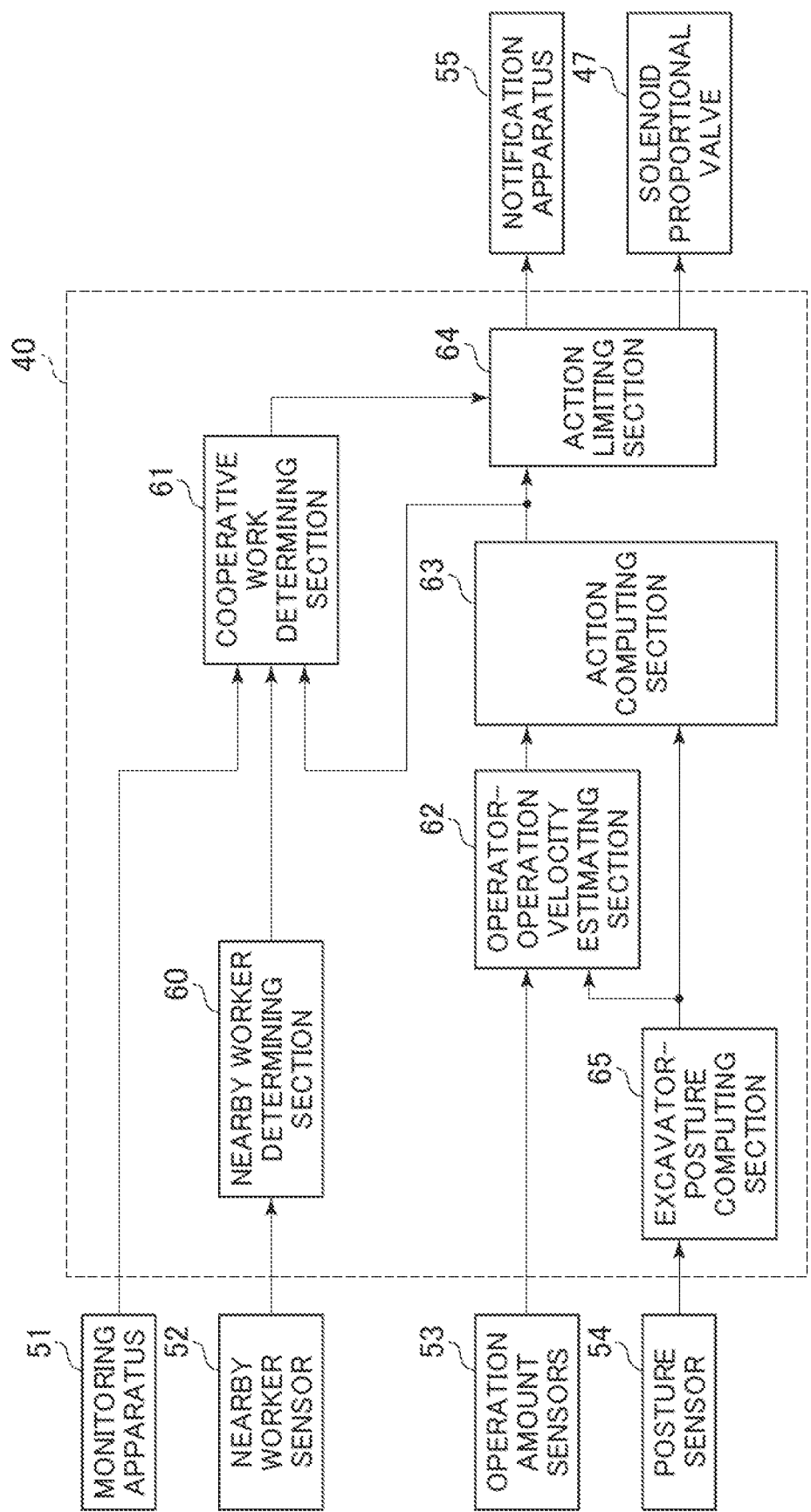
FIG. 13 is a figure depicting the configuration of the control system according to a second embodiment.

FIG. 13 depicts a functional block diagram of the controller 40 in the present embodiment. The controller 40 according to the present embodiment is connected with a posture sensor 54 including the swing angle sensor 19 and the angle sensors 30 to 32, and receives input of detection data of the angle sensors 19, and 30 to 32. In addition, by executing programs, the controller 40 functions as an excavator-posture computing section 65 that computes the posture of the hydraulic excavator 1, and an action computing section 63 that computes an action of the hydraulic excavator 1.

(Excavator-Posture Computing Section 65)

The excavator-posture computing section 65 computes the swing angle of the upper swing structure 12 in the excavator reference coordinate system from the detection data of the swing angle sensor 19. In addition, it computes the posture of the front work implement 1A in the excavator reference coordinate system from the detection data of the boom-angle sensor 30, the arm-angle sensor 31, and the bucket angle sensor 32. By using these pieces of angle information, and dimensional information (Lsb, Lbm, Lam, and Lbk depicted in FIG. 12) of portions of the hydraulic excavator 1, the postures and positions of the front implement members (the boom 8, the arm 9, the bucket 10, and the upper swing structure 12) of the hydraulic excavator 1 in the excavator reference coordinate system can be computed.

(Operator-Operation Velocity Estimating Section 62)

The operator-operation velocity estimating section 62 computes estimated velocities of the hydraulic actuators 3, 4, 5, 6, and 7 according to operator operation by using operator operation amounts of the operation devices 22 and 23 computed from detection data of the operation amount sensor 53, and a correlation table of operation amount and actuator velocity retained in the controller 40 in advance. Furthermore, the operator-operation velocity estimating section 62 converts the computed estimated velocities of the hydraulic actuators 3, 4, 5, 6, and 7 into a velocity (angular velocity) of the front work implement 1A (the front implement members 8, 9, and 10) by using the postural information of the hydraulic excavator 1 computed by the excavator-posture computing section 65.

(Action Computing Section 63)

The action computing section 63 computes an actual action of the hydraulic excavator 1 on the basis of detection data of the posture sensor 54. For example, the action computing section 63 computes a velocity vector (actual velocity vector) actually generated at the front work implement 1A on the basis of temporal changes in angle computed from detection data of the angle sensors 30 to 32 (temporal changes in the posture of the hydraulic excavator 1 computed by the excavator-posture computing section 65). In addition, the action computing section 63 can compute a direction in which the hydraulic excavator 1 swings and a direction in which the hydraulic excavator 1 travels in the machine-body coordinate system, from the swing angle of the hydraulic excavator 1, and operation amounts of the operation devices 23a and 23b. In addition, the action computing section 63 can also compute a velocity vector (estimated velocity vector) generated at the front work implement 1A according to operator operation, from the angular velocity of the front work implement 1A computed by the operator-operation velocity estimating section 62.

(Cooperative Work Determining Section 61)

The cooperative work determining section 61 according to the present embodiment determines whether or not cooperative work is being performed, by taking into consideration not only the content of operation input to the operation devices 22 and 23, but also an action direction of the hydraulic excavator 1 based on the operation.

Examples of actions of the hydraulic excavator 1 on the basis of which the cooperative work determining section 61 can determine that cooperative work is being performed include, for example, that the velocity vector of each portion of the hydraulic excavator generated by operation of the operation device 22 by an operator does not have a component oriented to a cooperating worker, and that an operation amount of the travel lever 23 is equal to or smaller than a threshold (i.e. the velocity of the lower travel structure 11 is equal to or lower than a threshold). For example, that the directions of both the actual velocity vector and the estimated velocity vector computed by the action computing section 63 do not have a component oriented to a cooperating worker may be used as a condition on the basis of which it is determined that cooperative work is being performed. In addition, even when a swing action of the front work implement 1A or the upper swing structure 12 does not generate, at the front work implement 1A, a velocity vector oriented to a cooperating worker, it may be determined that cooperative work is not being performed if travel operation is detected simultaneously with operation on the work implement 1A or the upper swing structure 12.

(Action Limiting Section 64)

Figure 14:
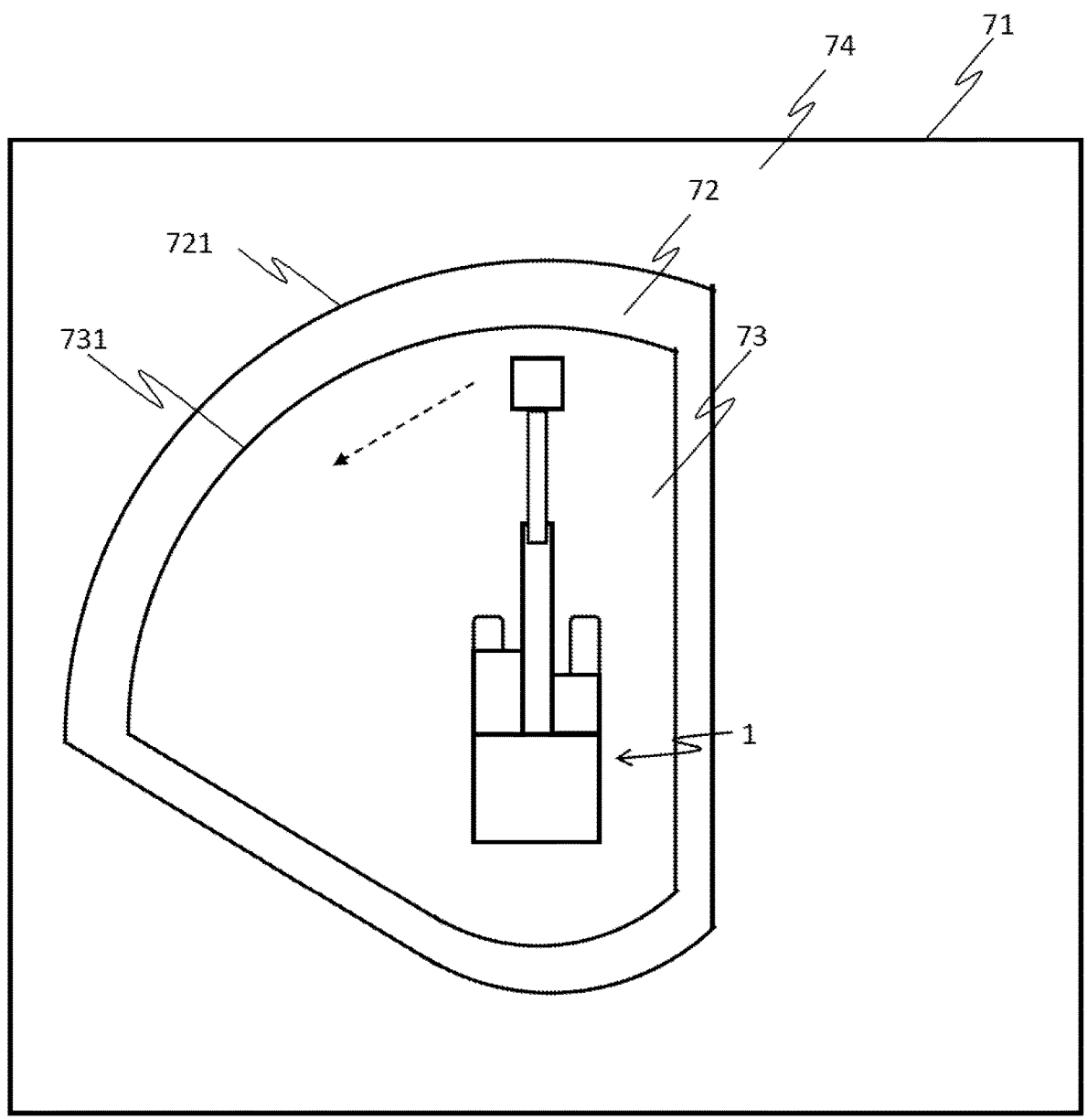
FIG. 14 is a figure depicting an example of the monitored area, the deceleration area, and the stop area.

The action limiting section 64 according to the present embodiment can change the positions of the stop area boundary 731 and the deceleration area boundary 721 depending on actions of the hydraulic excavator 1. That is, the action limiting section 64 can change the shapes of the deceleration area 72 and the stop area 73 depending on actions of the hydraulic excavator 1. Thereby, for example, it becomes possible for a cooperating worker to perform work at a position closer to the hydraulic excavator 1. For example, when a leftward velocity vector in the figure is generated at the front work implement 1A as depicted in FIG. 14, the shapes of the deceleration area 72 and the stop area 73 may be changed from the shapes depicted in FIG. 7 to the shapes depicted in FIG. 14. With the shapes in FIG.

14, the deceleration area 72 and the stop area 73 have smaller area sizes on the side located in a direction opposite to the action direction of the front work implement 1A.

(Flowchart According to Second Embodiment)

Figure 15:
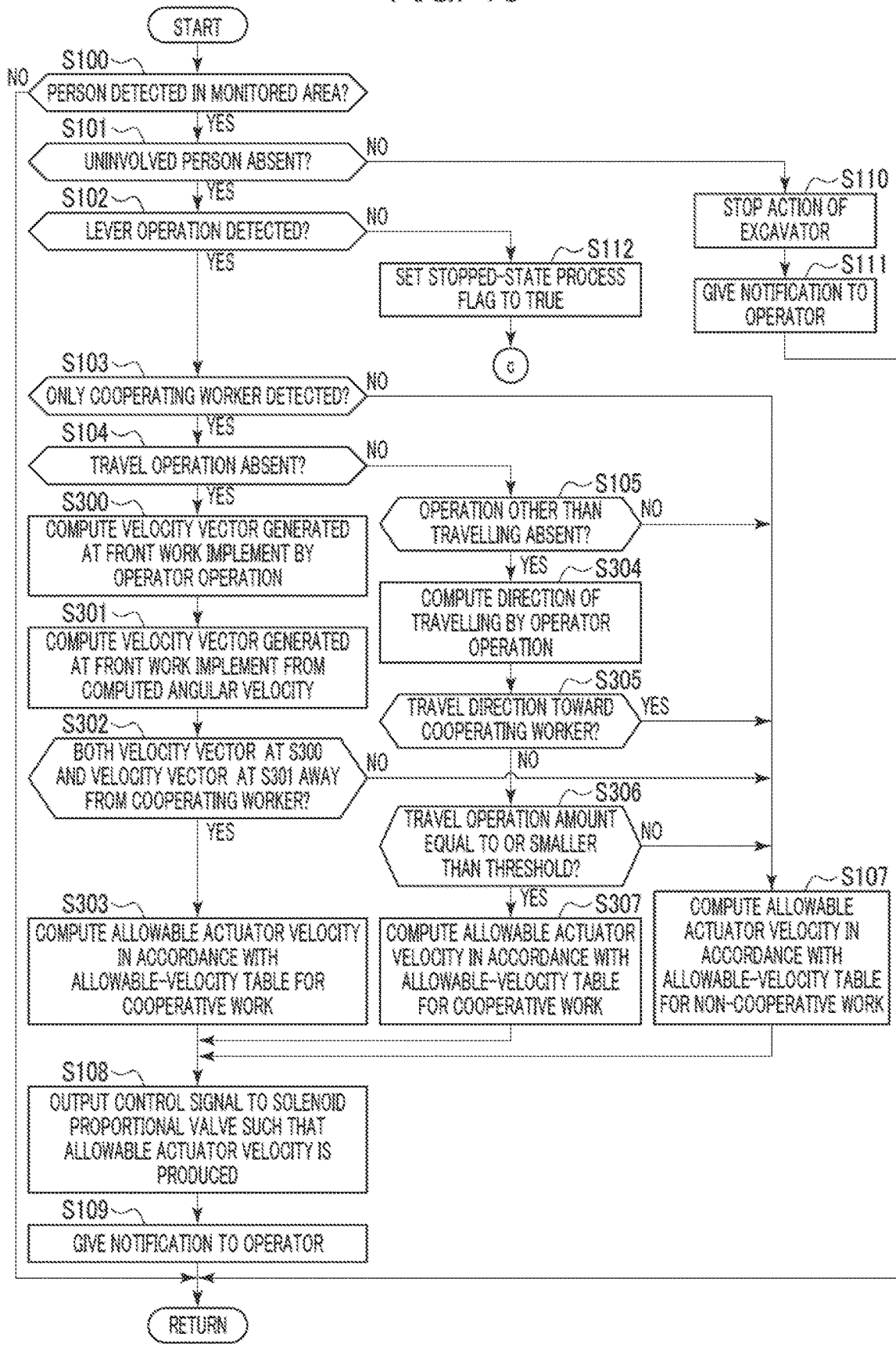
FIG. 15 is a figure depicting a flowchart according to the second embodiment.
Figure 16:
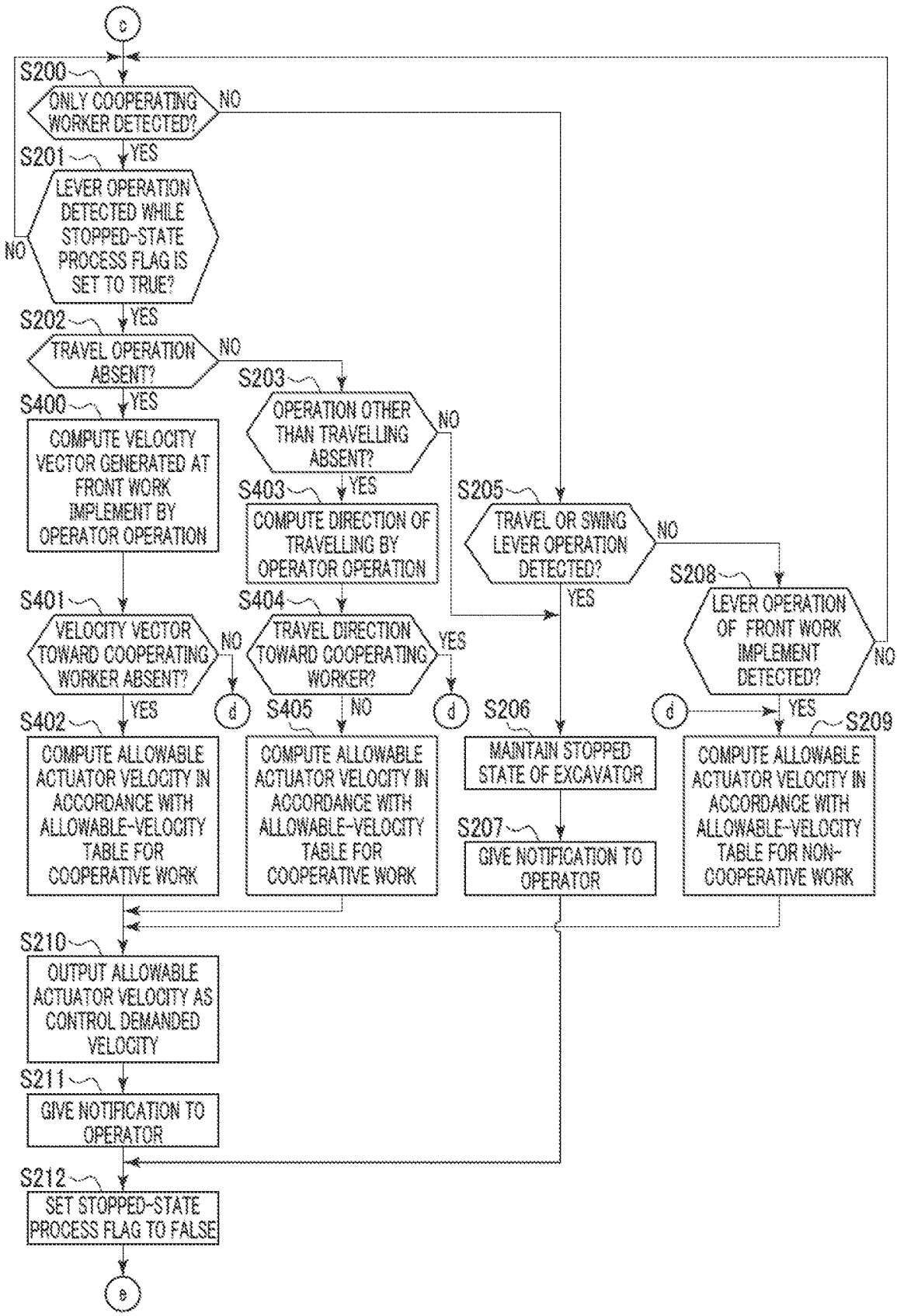
FIG. 16 is a figure depicting a flowchart according to the second embodiment.

Operation of contact prevention control executed by the controller 40 according to the present embodiment is explained by using FIG. 15 and FIG. 16.

In FIG. 15, processes performed at Steps S100, S101, S102, S103, S104, S108, S109, S110, and S111 are identical to their counterparts in the first embodiment. Note that when it is determined at Step S102 that operation input to the hydraulic excavator 1 is absent, the procedure proceeds to Step S200 in FIG. 16.

First, when it is determined that there is only a cooperating worker in the monitored area 71, and operation other than travel operation is input to the operation devices 22 and 23, the procedure proceeds to Step S300.

At Step S300, the controller 40 (action computing section 63) computes an estimated velocity vector which is a velocity vector generated at the front work implement 1A by operator operation.

At Step S301, the controller 40 (action computing section 63) computes an actual velocity vector which is a velocity vector actually generated at the front work implement 1A, on the basis of temporal changes (angular velocities) of the posture of the front work implement 1A computed at the excavator-posture computing section 65. Note that IMUs may be attached to the boom 8, the arm 9, and the bucket 10, and the angular velocities of the front work implement 1A may be computed by using values measured by the IMUs.

At Step S302, the controller 40 (cooperative work determining section 61) determines whether or not both the estimated velocity vector computed at Step S300 (the velocity vector generated at the front work implement 1A by the operator operation), and the actual velocity vector computed at Step S301 (the velocity vector generated at the front work implement 1A computed from the angular velocities of the portions of the front work implement 1A) are oriented to a cooperating worker. When both the two velocity vectors are not oriented to the cooperating worker, the procedure proceeds to Step S303. When at least one of the two velocity vectors is oriented to the cooperating worker, the procedure proceeds to Step S107.

At Step S303, the controller 40 (action limiting section 64) computes an allowable actuator velocity on the basis of the distance between the detected person and the area boundary, and the allowable-velocity table for cooperative work.

Second, when it is determined that there is only a cooperating worker in the monitored area 71, and only travel operation is input to the operation devices 22 and 23, the procedure proceeds to Step S304.

At Step S304, the controller 40 (action computing section 63) computes the direction in which the hydraulic excavator 1 (lower travel structure 11) is caused to travel by travel operation by the operator (the advancing direction of the hydraulic excavator 1 according to the travel operation), on the basis of the swing angle θsw detected by the swing angle sensor 19, and operation amounts detected by the operation amount sensors 53e and 53f.

At Step S305, the controller 40 (cooperative work determining section 61) determines whether or not the direction in which the hydraulic excavator 1 is caused to travel by the operator operation computed at Step S304 is oriented to a cooperating worker. When the travel direction is oriented to the cooperating worker, the procedure proceeds to Step S107. When the travel direction is not oriented to the cooperating worker, the procedure proceeds to Step S306.

At Step S306, the controller 40 (cooperative work determining section 61) determines whether an amount of travelling operation input to the operation device 23 is equal to or smaller than a threshold. When the amount is equal to or smaller than the threshold, the procedure proceeds to Step S307. When the amount exceeds the threshold, the procedure proceeds to Step S107. Note that Step S306 can be omitted.

At Step S307, the controller 40 (action limiting section 64) computes an allowable actuator velocity on the basis of the distance between the detected person and the area boundary, and the allowable-velocity table for cooperative work.

In FIG. 16, Step S200, and Steps S201, S202, S203, S205, S206, S207, S208, S209, S210, and S211 are the same as their counterparts in FIG. 11.

Third, when, after it is determined that there is only a cooperating worker in the monitored area 71 while the hydraulic excavator 1 has been stopped, operation other than travel operation is input to the operation devices 22 and 23, the procedure proceeds to Step S400.

At Step S400, the controller 40 (action computing section 63) computes an estimated velocity vector which is a velocity vector generated at the front work implement 1A by operator operation.

At Step S401, the controller 40 (cooperative work determining section 61) determines whether or not the estimated velocity vector computed at Step S400 (the velocity vector generated at the front work implement 1A by the operator operation) is oriented to a cooperating worker. When the estimated velocity vector is not oriented to the cooperating worker, the procedure proceeds to Step S402. When the velocity vector is oriented to the cooperating worker, the procedure proceeds to Step S209.

At Step S402, the controller 40 (action limiting section 64) computes an allowable actuator velocity on the basis of the distance between the detected person and the area boundary, and the allowable-velocity table for cooperative work.

Fourth, when, after it is determined that there is only a nearby worker in the monitored area 71 while the hydraulic excavator 1 has been stopped, and a non-cooperating worker is included in the monitored area 71 while the hydraulic excavator 1 has been stopped, only travel operation is input to the operation devices 22 and 23, the procedure proceeds to Step S403.

At Step S403, the controller 40 (action computing section 63) computes the direction in which the hydraulic excavator 1 (lower travel structure 11) is caused to travel by travel operation by the operator (the advancing direction of the hydraulic excavator 1 according to the travel operation), on the basis of the swing angle θsw detected by the swing angle sensor 19, and operation amounts detected by the operation amount sensors 53e and 53f.

At Step S404, the controller 40 (cooperative work determining section 61) determines whether or not the direction in which the hydraulic excavator 1 is caused to travel by the operator operation computed at Step S403 is oriented to a cooperating worker. When the direction is not oriented to the cooperating worker, the procedure proceeds to Step S405. When the direction is oriented to the cooperating worker, the procedure proceeds to Step S209.

At Step S405, the controller 40 (action limiting section 64) computes an allowable actuator velocity on the basis of the distance between the detected person and the area boundary, and the allowable-velocity table for cooperative work.

Note that whereas Step S300 and Step S301 are executed in the flowchart in FIG. 15 in terms of enhancement of the precision of computation of actions of the front work implement 1A, the determination at Step S302 may be made by using only the velocity vector computed at either one of Step S300 and Step S301. In addition, whereas the process at Step 306 is executed in terms of reduction of the possibility of contact between a cooperating worker and the hydraulic excavator 1, Step S306 can be omitted.

(Advantages)

Since an allowable-velocity table is selected taking into consideration not only operation input to the operation devices 22 and 23, but also the direction (velocity vector) of an action of the hydraulic excavator 1 in the present embodiment, velocity limitation reflecting actual actions of the hydraulic excavator 1 can be performed. By taking into consideration actual actions of the hydraulic excavator 1, the possibility of contact between the hydraulic excavator 1 and a cooperating worker can be reduced further. In addition, since velocity limitation is not performed when it is obvious that a cooperating worker and the hydraulic excavator 1 do not come into contact from a decision based on an action of the hydraulic excavator 1, and thereby the operator can cause the hydraulic excavator 1 to act as intended by the operator, the sense of discomfort felt by the operator at a time of work can be reduced.

(Others)

Note that, for determination regarding a person based on an action of the nearby worker, a wearable terminal that can acquire bio-information of the holder (step count, pulse, body temperature, etc.) may be used. For example, each nearby worker is caused to carry a wearable terminal that can communicate with the hydraulic excavator, and bio-information of the holder (nearby worker) is serially acquired/transmitted by the terminal. Then, when an abnormality of the physical condition of the nearby worker is detected on the basis of the transmitted bio-information, the nearby worker is classified as a non-cooperating worker or an uninvolved person even if the line of sight of the nearby worker is oriented to the hydraulic excavator 1. By taking into consideration bio-information of a nearby worker in this manner, the possibility of contact between the nearby worker and the hydraulic excavator can be reduced further.

Note that whereas the monitoring apparatus 51 and the nearby worker sensor 52 communicate with the controller 40 mounted on the hydraulic excavator 1 in the configuration explained as an example in the embodiments described above, a system that uses a server that generates control signals for a plurality of hydraulic excavators may be constructed. That is, a controller that generates or transmits control signals to be output to the solenoid proportional valves 47 needs not be mounted on the hydraulic excavator 1, but may be installed at a location apart from the hydraulic excavator 1.

Whereas allowable velocities are decided by using the two allowable-velocity tables (the first and second allowable-velocity tables) per actuator in the embodiments described above, allowable velocities may be decided by using three or more allowable-velocity tables per actuator. In addition, those that specify mathematical relations between allowable velocities and distances from the hydraulic excavator (boundary) are not limited to the tables (correlation diagrams) depicted in FIG. 9, but, for example, correlation tables, various types of computation/function and the like specifying mathematical relations between them can also be used.

In addition, each constituent element related to the controller 40 described above, and the functionality, execution process and the like of each constituent element may be partially or entirely realized by hardware (e.g. designing logic to execute each functionality in an integrated circuit, etc.). In addition, constituent elements related to the controller 40 described above may be a program (software) that is read out/executed by a computation processing apparatus (e.g. a CPU) to thereby realize each functionality related to the constituent elements of the controller 40. Information related to the program can be stored on, for example, a semiconductor memory (a flash memory, an SSD, etc.), a magnetic storage apparatus (a hard disk drive, etc.), a recording medium (a magnetic disc, an optical disc, etc.), and the like.

In addition, whereas control lines and information lines that are deemed to be necessary for the explanation of each embodiment are depicted in the explanation of the embodiment described above, all control lines and information lines related to products are not necessarily depicted. It may be considered that actually almost all constituent elements are connected mutually.

DESCRIPTION OF REFERENCE CHARACTERS

1: Hydraulic excavator
1A: Front work implement
2: Hydraulic pump
3: Travel hydraulic motor
4: Swing hydraulic motor
5: Boom cylinder
6: Arm cylinder
7: Bucket cylinder
8: Boom
9: Arm
10: Bucket
11: Lower travel structure
12: Upper swing structure
19: Swing angle sensor
22: Operation device
23: Operation device
30: Boom-angle sensor
31: Arm-angle sensor
32: Bucket angle sensor
40: Controller (controller)
47: Solenoid proportional valve
51: Monitoring apparatus
52: Nearby worker sensor
53: Operation amount sensor
54: Posture sensor
55: Notification apparatus
60: Nearby worker determining section
61: Cooperative work determining section
62: Operator-operation velocity estimating section
63: Action computing section
64: Action limiting section
65: Excavator-posture computing section
71: Monitored area
72: Deceleration area
73: Stop area
74: Normal area
721: Deceleration area boundary
731: Stop area boundary

The invention claimed is:

1. A work machine control system comprising:
a monitoring apparatus that detects a position of a person in a predetermined area set around a work machine; and
a controller configured to generate a control signal for limiting an action of the work machine on a basis of a positional relation between the work machine and a detected person who is a person detected by the monitoring apparatus, and control the work machine on a basis of the control signal, wherein
the monitoring apparatus further detects an action of the detected person,
the controller is configured to
   determine whether the detected person is a cooperating worker or a non-cooperating worker by using information about the action of the detected person detected by the monitoring apparatus,
   change an allowable velocity of the work machine at a time of limiting an action of the work machine on a basis of whether the detected person is a cooperating worker or a non-cooperating worker, or on a basis of whether the detected person is a cooperating worker or a non-cooperating worker and of the action of the work machine, wherein
      the allowable velocity of the work machine is changed on a basis of a plurality of mathematical relations including a first mathematical relation and a second mathematical relation each of which specifies a correspondence between the allowable velocity of the work machine and the positional relation between the detected person and the work machine,
      the second mathematical relation is specified such that the allowable velocity of the work machine is faster than in the first mathematical relation in terms of comparison under a condition where the positional relation between the detected person and the work machine is a same,
      the second mathematical relation is specified such that a boundary of a deceleration area where the limiting of the allowable velocity of the work machine begins and a boundary of the stopping area where the allowable velocity of the work machine becomes zero are each closer to the work machine than the first mathematical relation, and
   wherein the controller is configured to:
      decide the allowable velocity of the work machine on a basis of the second mathematical relation when it is determined that there is only the cooperating worker in the predetermined area, and when any one of only front-implement operation, only swing operation, combined operation of front-implement operation and swing operation, and only travel operation is input to an operation device for operating the work machine,
      decide the allowable velocity of the work machine on a basis of the first mathematical relation when it is determined that the predetermined area includes the non-cooperating worker, and
      decide the allowable velocity of the work machine on a basis of the first mathematical relation when it is determined that there is only the cooperating worker in the predetermined area, and when any one of combined operation of travel operation and swing operation, combined operation of travel operation and front-implement operation, and combined operation of travel operation, swing operation and front-implement operation is input to the operation device.

2. The work machine control system according to claim 1, wherein
the controller is configured to
   decide the allowable velocity of the work machine on a basis of the second mathematical relation when any one of only front-implement operation, only swing operation, combined operation of front-implement operation and swing operation, and only travel operation is input to an operation device for operating the work machine after it is determined that there is only the cooperating worker in the predetermined area while the work machine has been stopped, and
   keep the work machine stopped when any one of combined operation of travel operation and swing operation, combined operation of travel operation and front-implement operation, and combined operation of travel operation, swing operation, and front-implement operation is input to the operation device after it is determined that there is only the cooperating worker in the predetermined area while the work machine has been stopped.

3. The work machine control system according to claim 1, wherein
the controller is configured to
   keep the work machine stopped when any one of only travel operation, only swing operation, combined operation of travel operation and swing operation, combined operation of travel operation and front-implement operation, combined operation of swing operation and front-implement operation, and combined operation of travel operation, swing operation, and front-implement operation is input to an operation device for operating the work machine after it is determined that the non-cooperating worker is included in the predetermined area while the work machine has been stopped.

4. The work machine control system according to claim 1, wherein
the controller is configured to
   decide the allowable velocity of the work machine on a basis of the first mathematical relation when only front-implement operation is input to an operation device for operating the work machine after it is determined that the non-cooperating worker is included in the predetermined area while the work machine has been stopped.

5. The work machine control system according to claim 1, wherein
the controller is configured to
   compute a velocity vector of the work machine on a basis of detected values of a plurality of sensors attached to the work machine,
   decide the allowable velocity of the work machine on a basis of the second mathematical relation when it is determined that there is only the cooperating worker in the predetermined area, when any one of only front-implement operation, only swing operation, and combined operation of front-implement operation and swing operation is input to an operation device for operating the work machine, and when the velocity vector is not oriented to the cooperating worker, and decide the allowable velocity of the work machine on a basis of the second mathematical relation when it is determined that there is only the cooperating worker in the predetermined area, when only travel operation is input to the operation device, when the velocity vector is not oriented to the cooperating worker, and when an operation amount of the travel operation is equal to or smaller than a predetermined threshold.

6. The work machine control system according to claim 1, wherein
the controller is configured to
compute a velocity vector of the work machine on a basis of detected values of a plurality of sensors attached to the work machine,
decide the allowable velocity of the work machine on a basis of the second mathematical relation when any one of only front-implement operation, only swing operation, and combined operation of front-implement operation and swing operation is input to an operation device for operating the work machine, and when the velocity vector is not oriented to the cooperating worker, after it is determined that there is only the cooperating worker in the predetermined area while the work machine has been stopped, and
decide the allowable velocity of the work machine on a basis of the second mathematical relation when it is determined that there is only the cooperating worker in the predetermined area while the work machine has been stopped, when only travel operation is input to the operation device, and when the velocity vector is not oriented to the cooperating worker.

7. The work machine control system according to claim 1, wherein
the controller is configured to
compute a velocity vector of the work machine on a basis of detected values of a plurality of sensors attached to the work machine,
decide the allowable velocity of the work machine on a basis of the first mathematical relation when any one of only front-implement operation, only swing operation, and combined operation of front-implement operation and swing operation is input to an operation device for operating the work machine, and when the velocity vector is oriented to the cooperating worker, after it is determined that there is only the cooperating worker in the predetermined area while the work machine has been stopped, and
decide the allowable velocity of the work machine on a basis of the first mathematical relation when it is determined that there is only the cooperating worker in the predetermined area while the work machine has been stopped, when only travel operation is input to the operation device, and when the velocity vector is oriented to the cooperating worker.

8. The work machine control system according to claim 1, wherein
the monitoring apparatus detects a line of sight as an action of the detected person, and
the controller is configured to determine that the detected person whose line of sight is detected is the cooperating worker, when there is the work implement ahead of the line of sight of the detected person detected by the monitoring apparatus.

* * * * *